US009849745B2

(12) United States Patent
Fulton et al.

(10) Patent No.: US 9,849,745 B2
(45) Date of Patent: *Dec. 26, 2017

(54) VEHICLE SUSPENSION SYSTEM WITH RESERVOIR FOR AIR SPRING DAMPING

(71) Applicants: Hendrickson USA, L.L.C., Itasca, IL (US); Watson & Chalin Manufacturing Inc., McKinney, TX (US)

(72) Inventors: R. Scott Fulton, Hudson, OH (US); John E. Ramsey, Canton, OH (US); Kimm L. Carr, Canton, OH (US); Brett L. Muckelrath, North Canton, OH (US); Thomas J. Long, Canton, OH (US); William W. Brewer, Atwater, OH (US); Damon Delorenzis, McKinney, TX (US); Andrew J. Westnedge, Granville, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,604

(22) Filed: Feb. 24, 2014

(65) Prior Publication Data
US 2014/0300076 A1 Oct. 9, 2014

Related U.S. Application Data

(63) Continuation-in-part of application No. 13/855,788, filed on Apr. 3, 2013, now Pat. No. 9,139,061.

(51) Int. Cl.
*B60G 11/30* (2006.01)
*B60G 11/27* (2006.01)
*F16F 9/04* (2006.01)

(52) U.S. Cl.
CPC .............. *B60G 11/30* (2013.01); *B60G 11/27* (2013.01); *F16F 9/04* (2013.01); *B60G 2202/152* (2013.01)

(58) Field of Classification Search
CPC ...... B60G 11/30; B60G 17/0528; B60B 35/08
(Continued)

(56) References Cited

U.S. PATENT DOCUMENTS 1,436,144 A * 11/1922 Berrat .......................... 267/64.23
2,713,498 A * 7/1955 Brown ..................... B60G 5/04
267/256

(Continued)

FOREIGN PATENT DOCUMENTS

FR 2678867 1/1993

OTHER PUBLICATIONS

"Experimental and Theoretical Analysis of an Air Spring With Auxiliary Reservoir", Giuseppe Quaglia and Massimo Sorli, Dept. of Mechanics, Politecnico di Torino, Corso Duca degli Abruzzi 24-10129 Torino-Italy.

*Primary Examiner* — Paul N Dickson
*Assistant Examiner* — Timothy Wilhelm
(74) *Attorney, Agent, or Firm* — Dureska & Moore, LLC; David P. Dureska; Brent L. Moore

(57) ABSTRACT

A suspension system can include an air spring, an air reservoir external to the air spring, and a flow control device which variably restricts flow of air between the air spring and the air reservoir. Flow between the air spring and the air reservoir may be permitted in response to compliance of the suspension system, and the air spring can have an internal air volume at least 2½ times as great may permit flow between the air spring and the air reservoir in response to a predetermined pressure differential level across the flow control device. Multiple air reservoirs can be internal to an axle, or
(Continued)

other suspension system or vehicle component, and can be isolated from each other.

10 Claims, 32 Drawing Sheets

(58) Field of Classification Search
USPC .................................................. 280/124.159
See application file for complete search history.

(56) References Cited

U.S. PATENT DOCUMENTS

| | | | | |
|---|---|---|---|---|
| 2,773,686 | A * | 12/1956 | Nash | F16F 9/049 105/198.1 |
| 2,901,241 | A * | 8/1959 | Lautzenhiser et al. | 267/186 |
| 2,902,291 | A * | 9/1959 | Walker | 280/6.159 |
| 3,063,732 | A * | 11/1962 | Harbers et al. | 280/6.16 |
| 3,212,769 | A * | 10/1965 | Ishibashi et al. | 267/64.23 |
| 3,395,931 | A | 8/1968 | Piret | |
| 3,880,445 | A * | 4/1975 | Chieger | B60G 5/00 280/762 |
| 3,904,181 | A * | 9/1975 | Harsy-Vadas | 267/35 |
| 4,325,541 | A * | 4/1982 | Korosladanyi | B60G 11/27 267/220 |
| 4,379,572 | A * | 4/1983 | Hedenberg | B60G 9/00 280/124.116 |
| 4,687,222 | A * | 8/1987 | Chalmers | B60G 5/04 280/678 |
| 4,762,308 | A * | 8/1988 | Geno | B60G 15/14 137/849 |
| 4,844,428 | A | 7/1989 | Margolis et al. | |
| 4,923,210 | A | 5/1990 | Heider et al. | |
| 5,111,735 | A * | 5/1992 | Johnson | B60G 17/052 91/433 |
| 5,374,077 | A * | 12/1994 | Penzotti et al. | 280/683 |
| 5,403,031 | A | 4/1995 | Gottschalk et al. | |
| 5,413,316 | A * | 5/1995 | Easter | B60G 17/0155 267/64.24 |
| 5,873,581 | A * | 2/1999 | Yale | 280/5.514 |
| 6,149,142 | A | 11/2000 | Penzotti | |
| 6,398,179 | B1 * | 6/2002 | Soles | B60G 11/28 248/222.51 |
| 6,398,236 | B1 * | 6/2002 | Richardson | 280/86.5 |
| 6,412,789 | B1 | 7/2002 | Pierce et al. | |
| 6,691,989 | B1 * | 2/2004 | Leonard | B60G 17/0521 267/118 |
| 6,698,730 | B2 * | 3/2004 | Easter | 267/64.28 |
| 6,746,031 | B2 * | 6/2004 | Carlstedt | 280/124.107 |
| 7,338,550 | B2 * | 3/2008 | Hoffman | 95/148 |
| 7,503,586 | B2 * | 3/2009 | Ramsey | B60G 7/02 280/124.157 |
| 7,510,197 | B2 * | 3/2009 | Gottschalk | 280/86.5 |
| 8,844,912 | B2 * | 9/2014 | Naber | F16F 9/5126 188/282.1 |
| 8,851,237 | B2 * | 10/2014 | Stone | B66F 7/085 187/211 |
| 8,998,184 | B2 * | 4/2015 | Buttner | F16F 9/43 267/122 |
| 9,079,469 | B2 * | 7/2015 | Dehmel | B60G 11/27 |
| 2004/0084858 | A1 | 5/2004 | Svartz et al. | |
| 2004/0245687 | A1 | 12/2004 | Sendrea et al. | |
| 2004/0251653 | A1 * | 12/2004 | Momiyama | 280/124.157 |
| 2008/0238017 | A1 | 10/2008 | Sandbulte et al. | |
| 2010/0276852 | A1 * | 11/2010 | Beuermann | B60G 17/0155 267/64.27 |
| 2011/0115140 | A1 * | 5/2011 | Moulik | B60G 15/14 267/64.23 |
| 2013/0099459 | A1 * | 4/2013 | Remboski et al. | 280/124.16 |

* cited by examiner

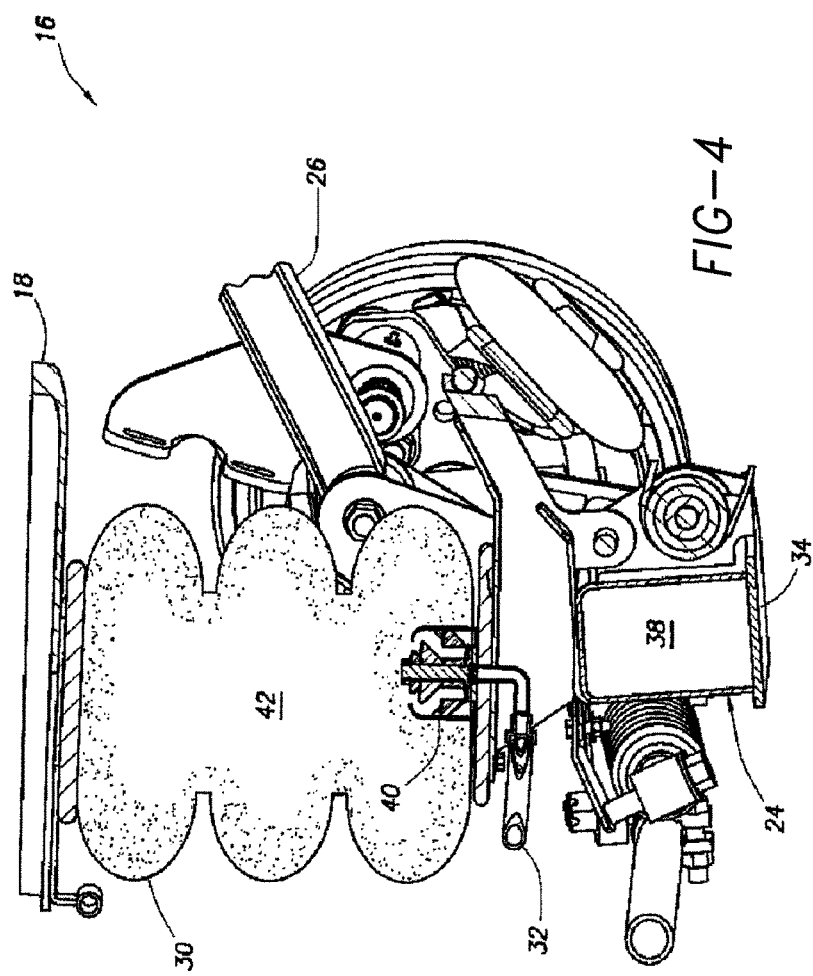

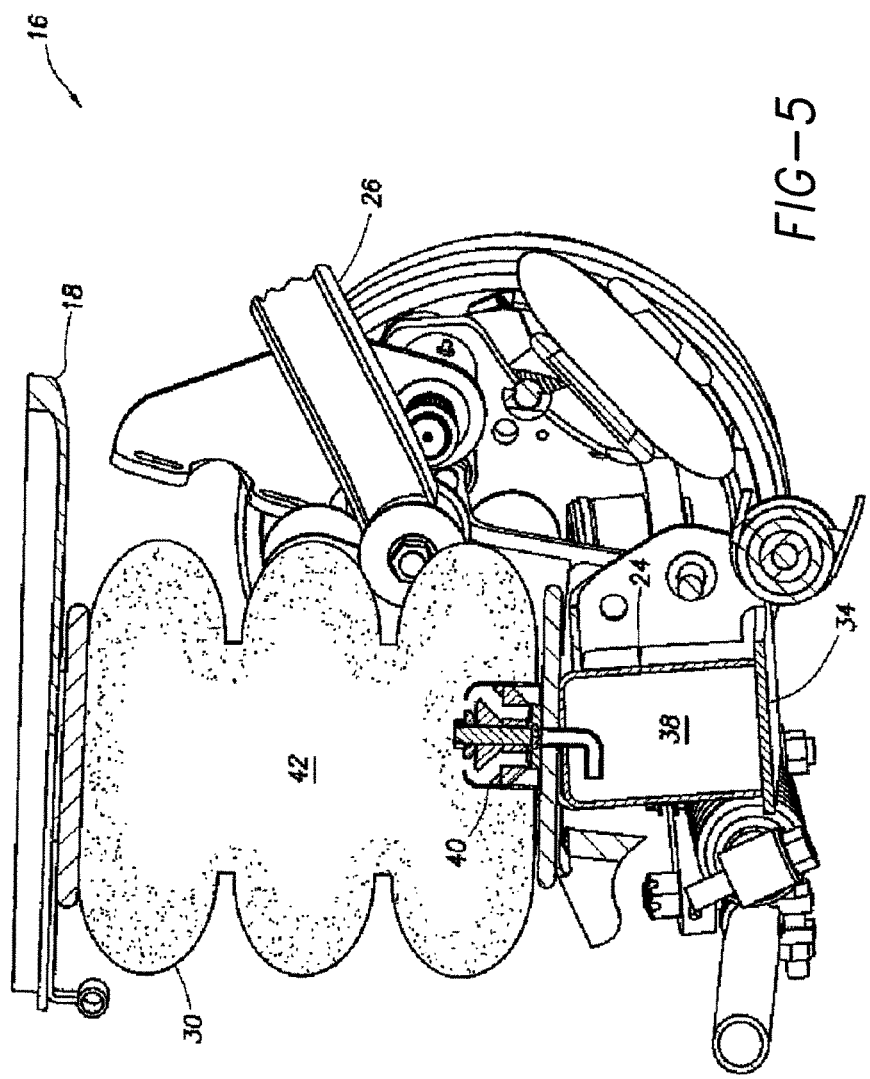

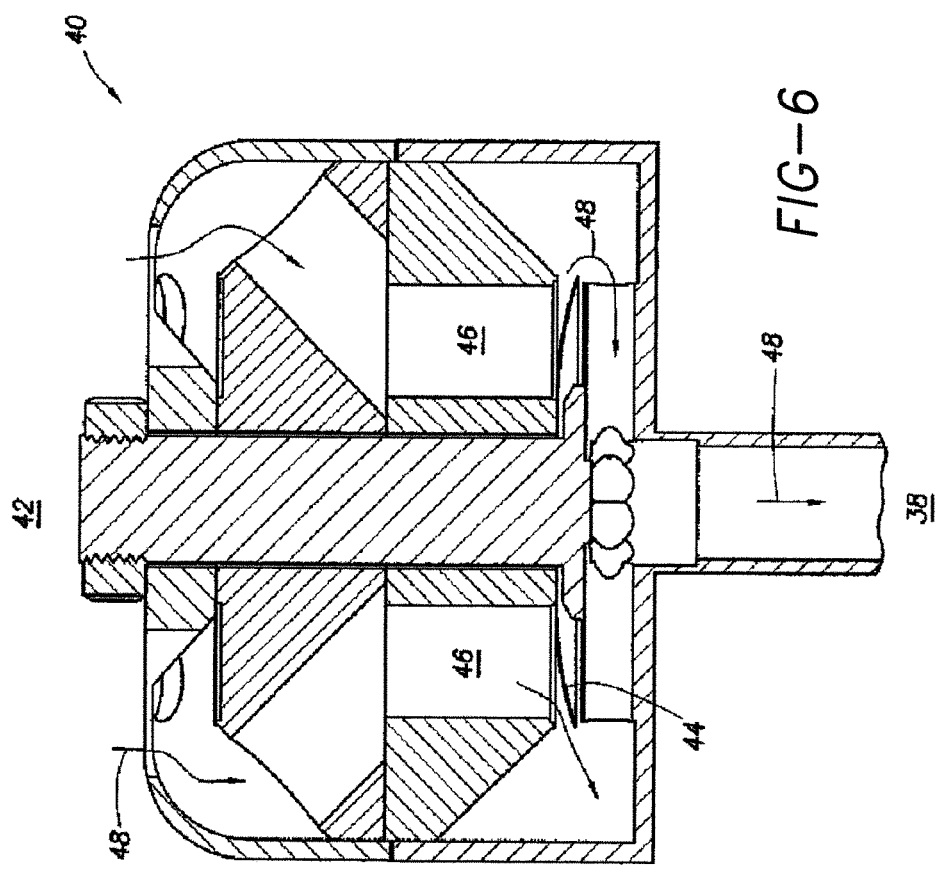

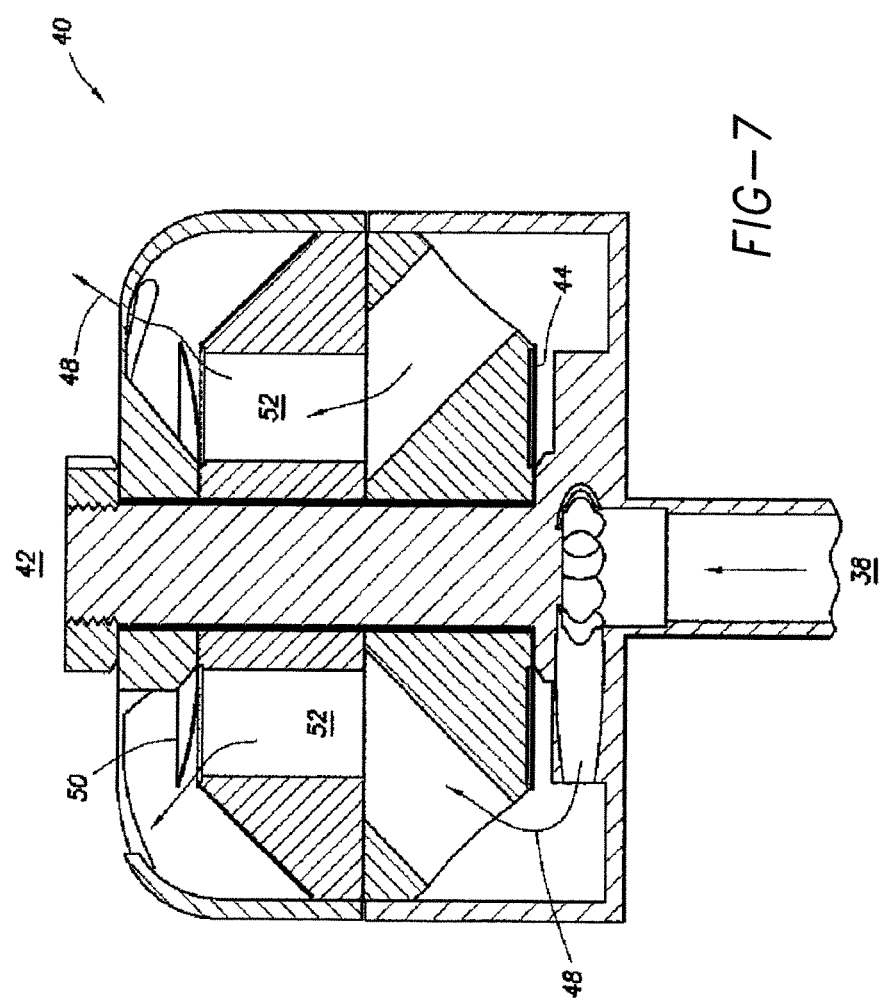

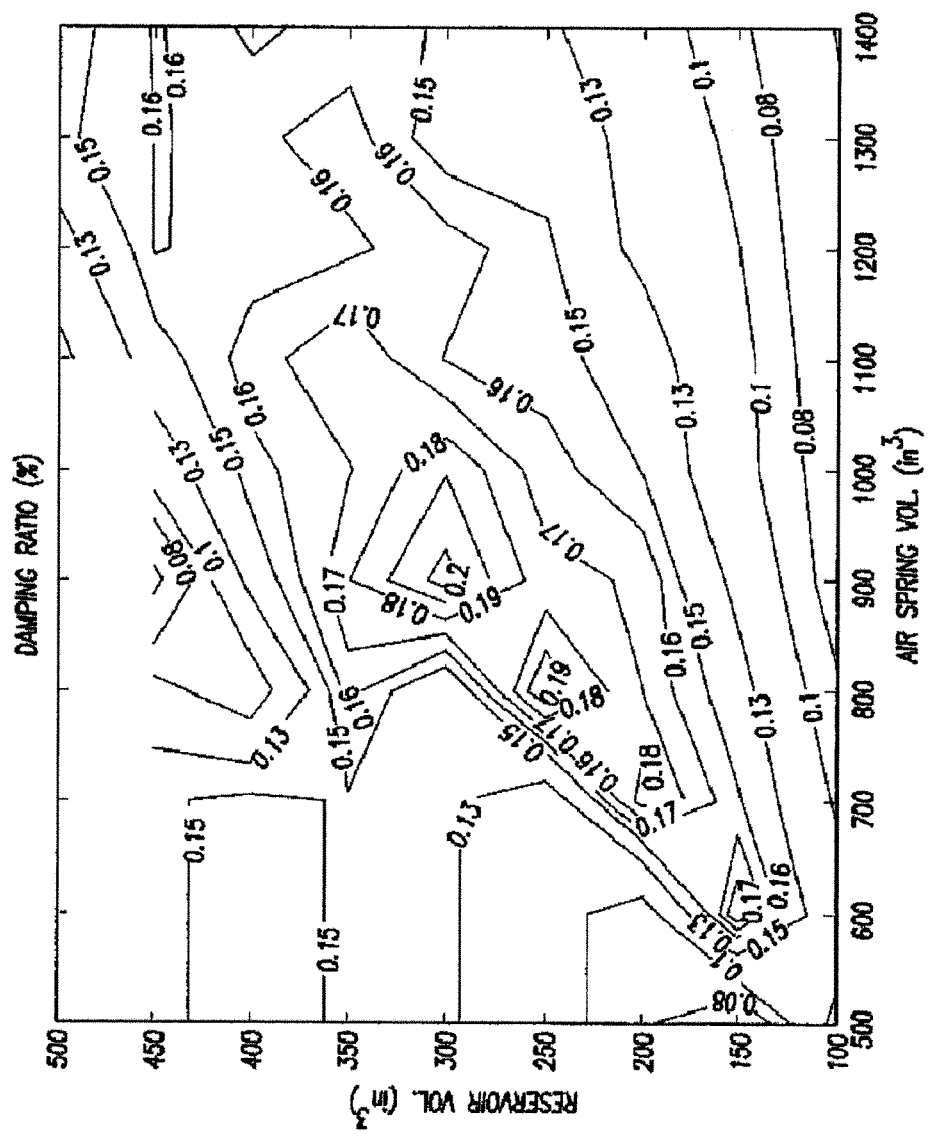

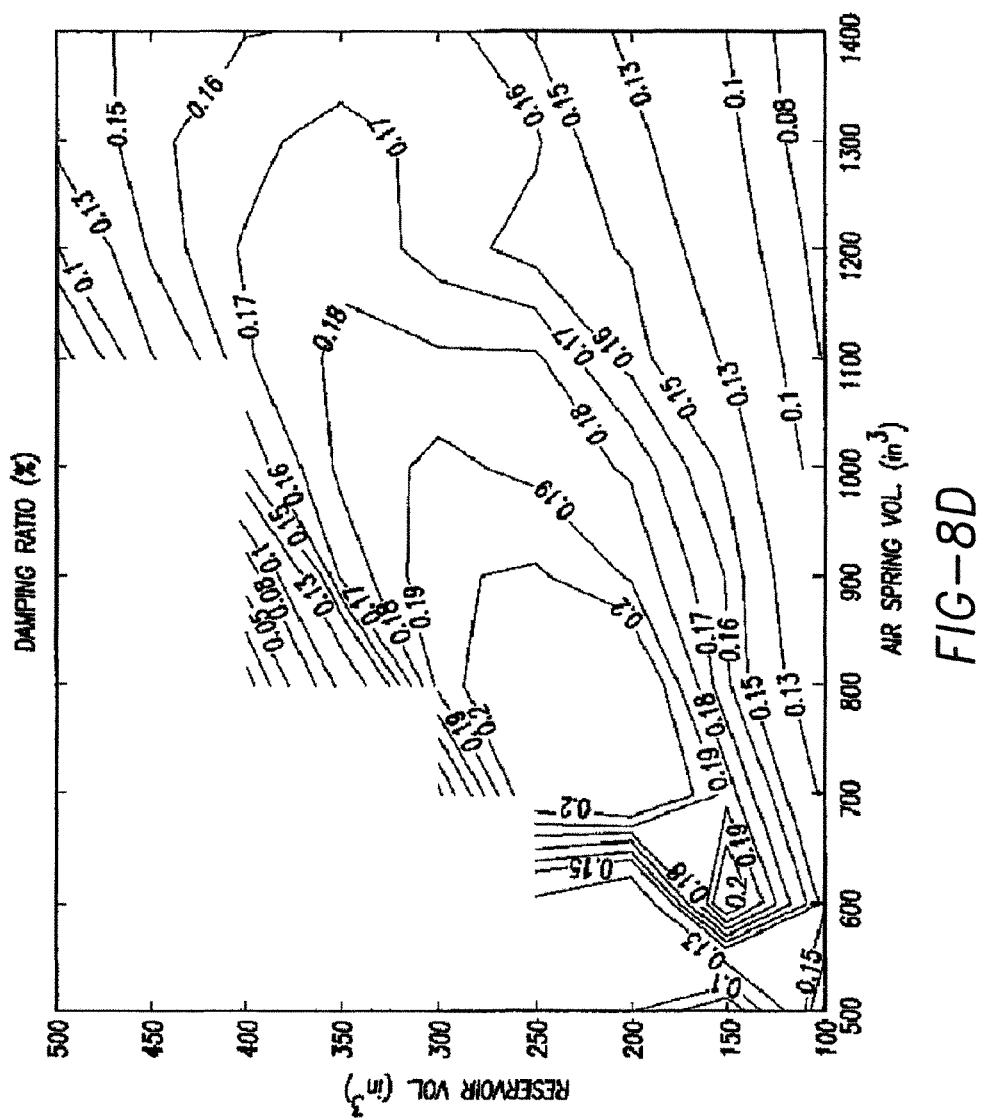

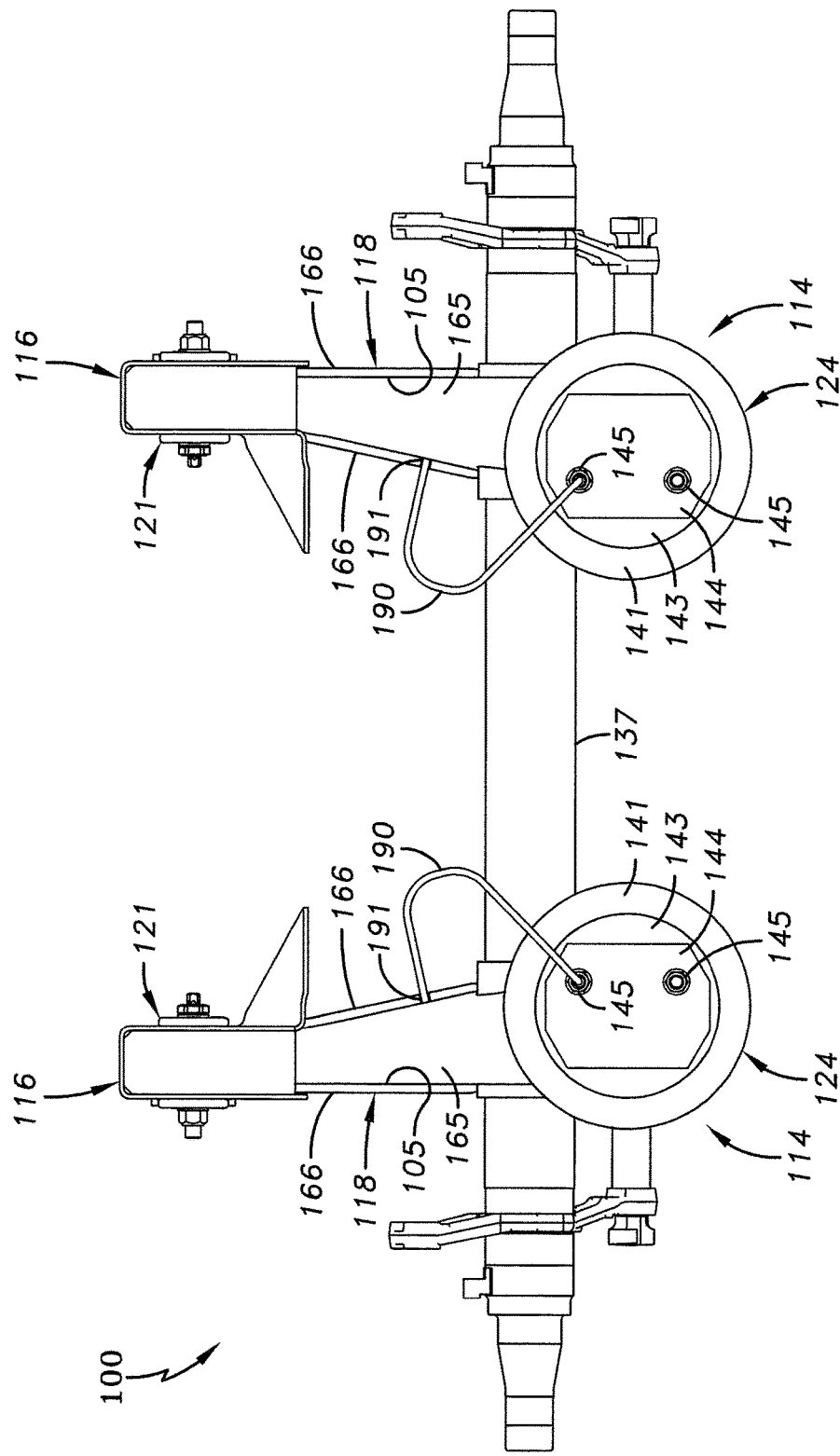

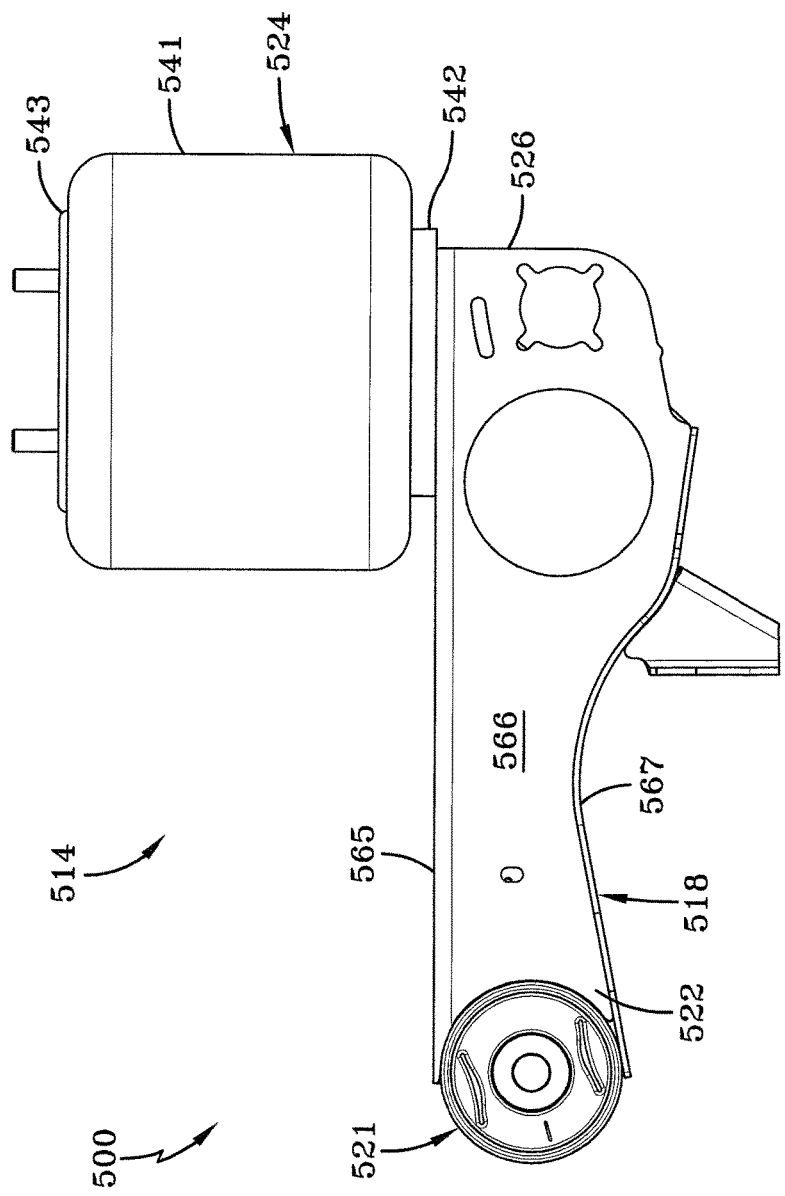

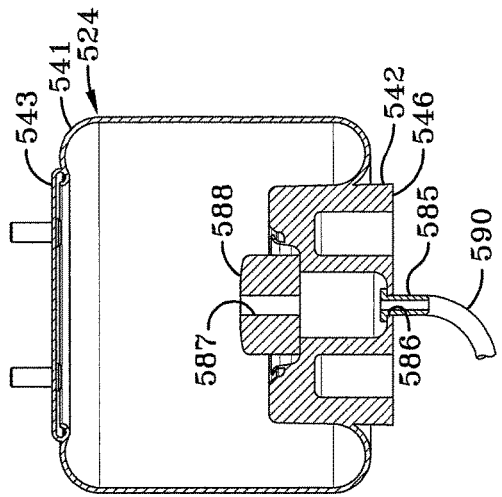
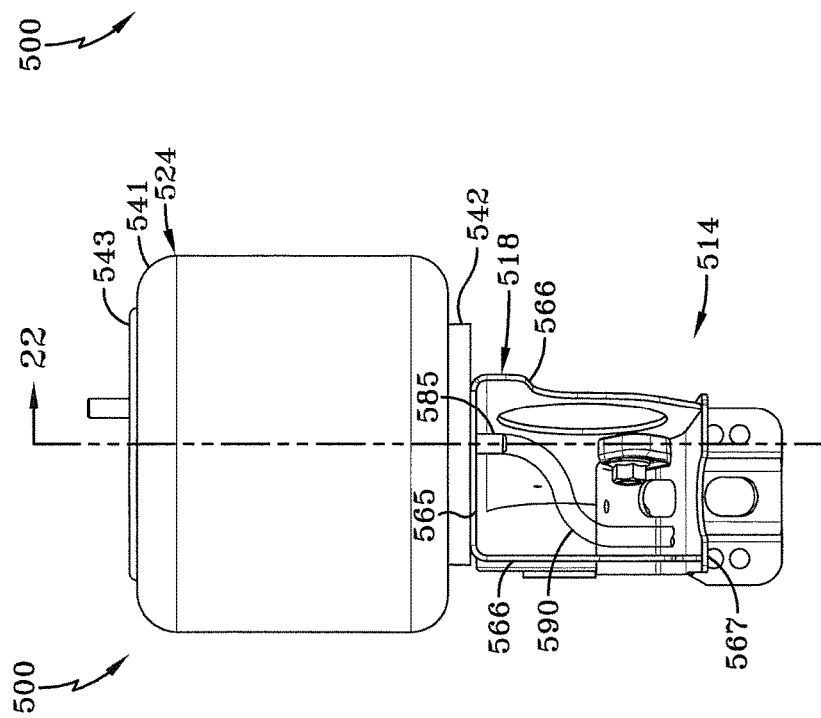

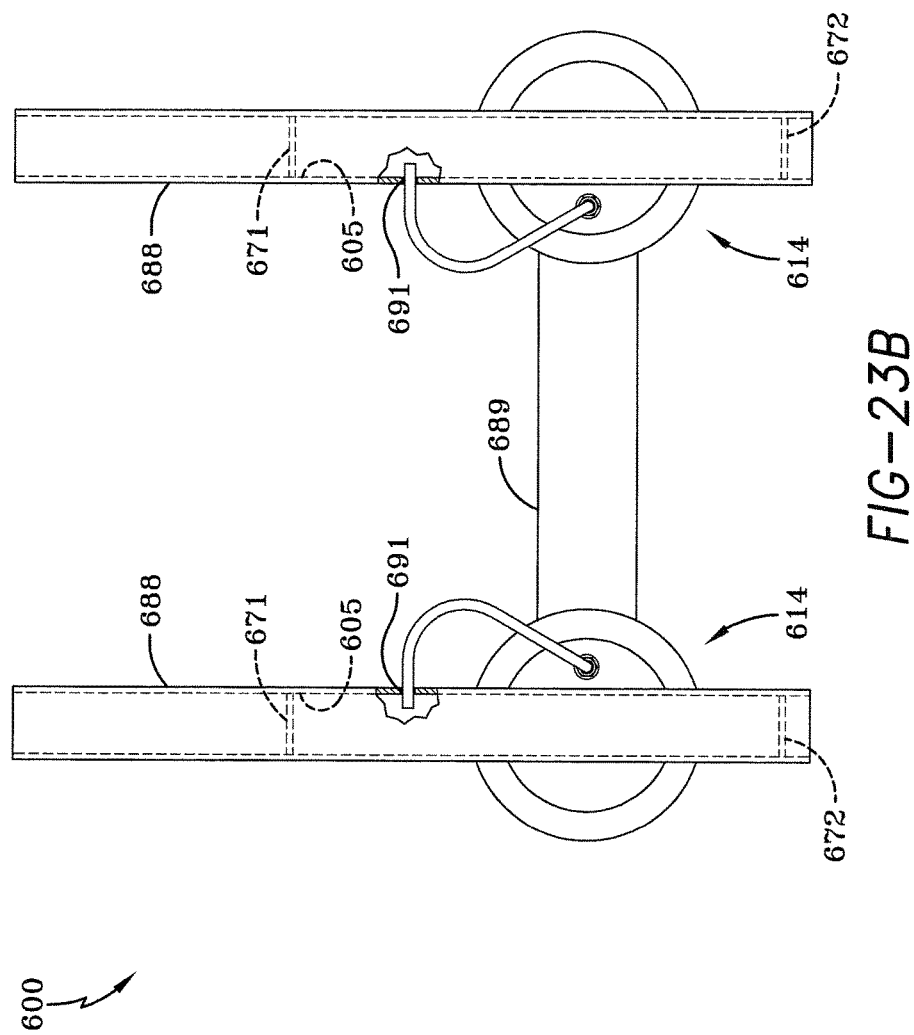

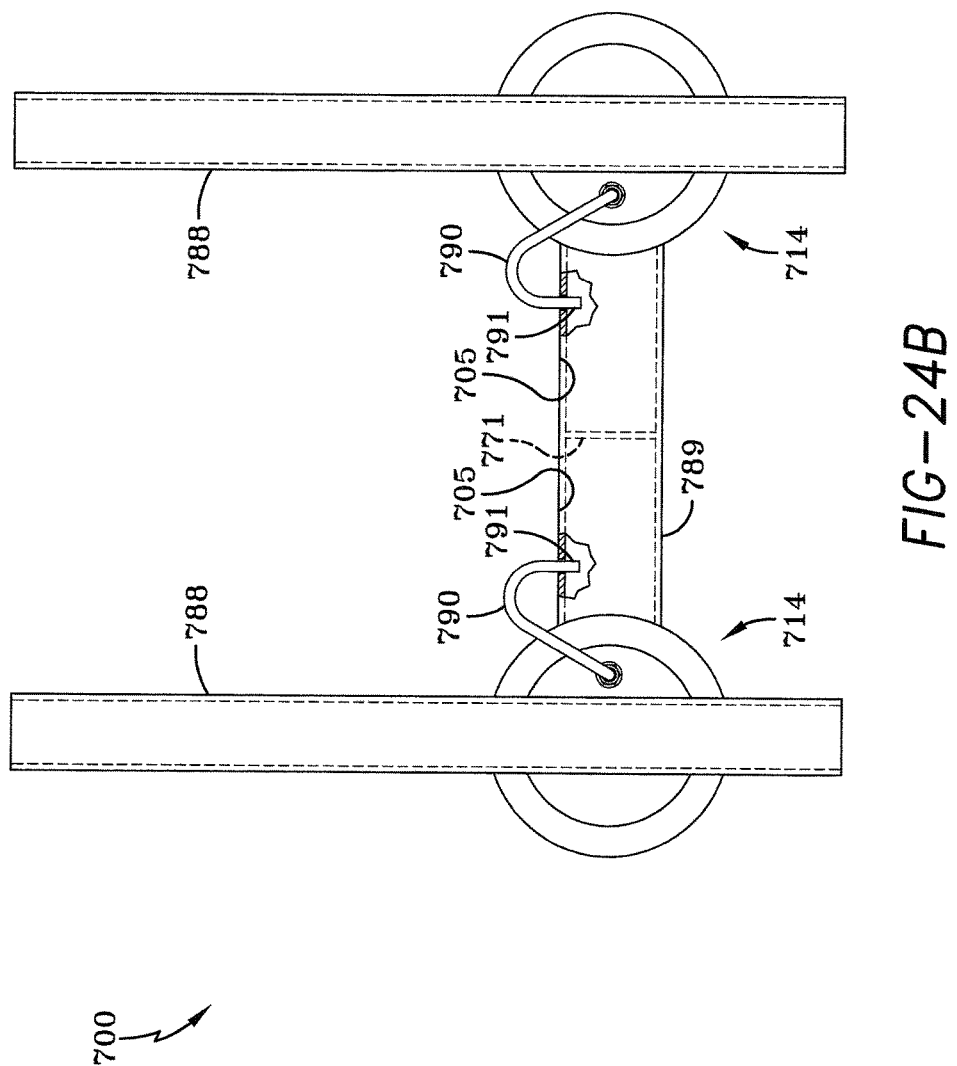

VEHICLE SUSPENSION SYSTEM WITH RESERVOIR FOR AIR SPRING DAMPING

CROSS-REFERENCE TO RELATED APPLICATION

This application is a continuation-in-part of U.S. patent application Ser. No. 13/855,788, filed Apr. 3, 2013.

BACKGROUND

This disclosure relates generally to vehicle suspension systems, also known as axle/suspension systems, and, in several examples described below, more particularly provides air spring damping in a suspension system utilizing an external reservoir separate from the air spring.

It is known to dampen deflection of a suspension system equipped with air springs. In one technique, a reservoir is provided internally to an air spring so that, as the air spring is compressed and extended during suspension system compliance, air is transferred back and forth between the reservoir and an internal volume of the air spring.

However, in some situations, sufficient volume is not available in an air spring for an internal damping reservoir. In addition, many prior designs with internal damping reservoirs have not achieved a desired damping ratio for comfortable and safe vehicle use.

Therefore, it will be appreciated that improvements are needed in the art of damping suspension systems equipped with air springs.

BRIEF DESCRIPTION OF THE DRAWINGS

FIG. 4 is a representative cross-sectional view of an air spring and axle portion of the suspension system.

FIG. 5 is a representative cross-sectional view of another example of the suspension system.

FIG. 6 is an enlarged scale representative cross-sectional view of a flow control device which may be used in the suspension system, with downward flow being permitted through the device.

FIG. 7 is a representative cross-sectional view of the flow control device, with upward flow being permitted through the device.

FIGS. 8A-F are representative graphs of damping ratio versus reservoir and air spring volumes for the suspension system with various axle loadings.

FIG. 9 is a representative top view of a first preferred embodiment suspension system of the present invention which may be used in the vehicle of FIG. 1, showing the external air reservoir volume included in each one of the beams of respective suspension assemblies of the suspension system.

FIG. 20 is a representative side view of a beam of a suspension assembly for a suspension system incorporating an alternative hose arrangement for providing fluid communication between the external air reservoir and the air spring through the piston of the air spring.

FIG. 21 is a representative rear view of the beam and air spring shown in FIG. 20, showing the combination threaded stud/air port extending through the bottom of the piston of the air spring and showing a portion of the hose.

FIG. 22 is a representative cross-sectional view of the air spring shown in FIG. 21, showing the air passage through the internal bumper of the air spring and through the combination threaded stud/air port connected to the hose.

FIG. 23B is representative top view of the fifth preferred embodiment suspension system shown in FIG. 23 incorporated into a slider box with hidden portions represented by broken lines, showing the external air reservoirs incorporated into the main members of the slider box.

FIG. 24B is representative top view of the sixth preferred embodiment suspension system shown in FIG. 23 incorporated into a slider box with hidden portions represented by broken lines, showing the air reservoirs incorporated into the cross member of the slider box.

Similar numerals refer to similar parts throughout the drawings.

DETAILED DESCRIPTION

Figure 1:
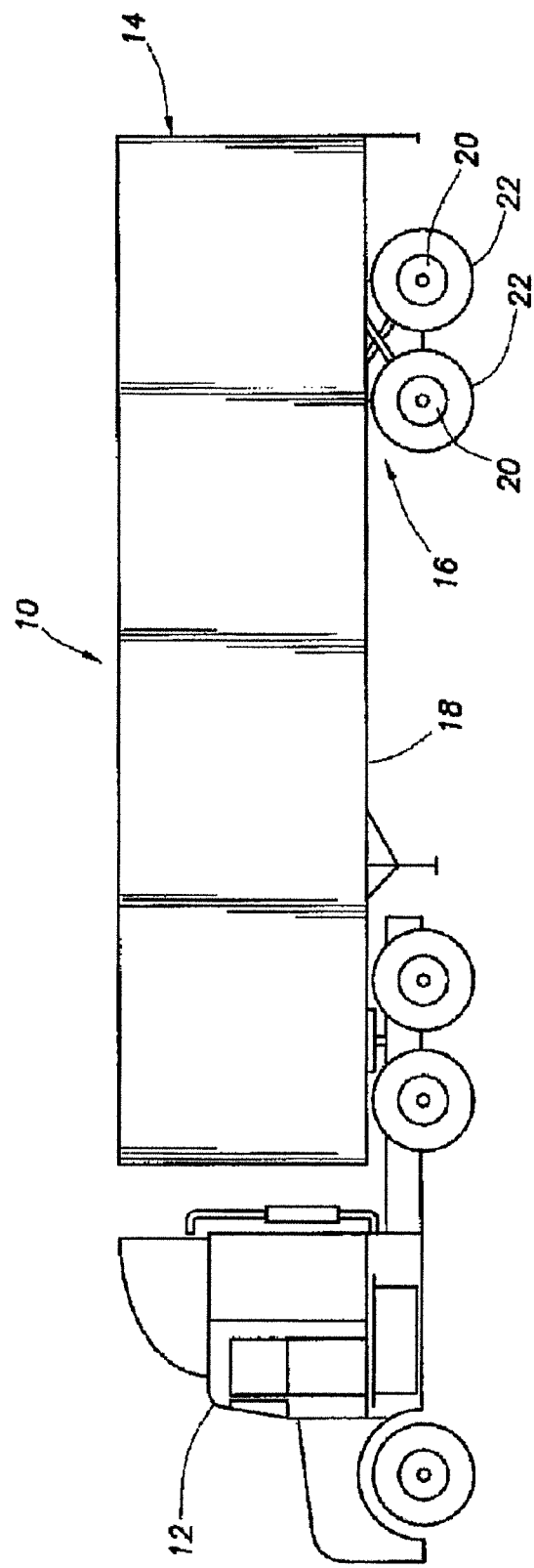
FIG. 1 is a representative partially cross-sectional view of a vehicle which can embody principles of this disclosure.

Representatively illustrated in FIG. 1 is a vehicle 10 which can embody principles of this disclosure. However, it should be clearly understood that the vehicle 10 is merely one example of an application of the principles of this disclosure in practice, and a wide variety of other examples are possible. Therefore, the scope of this disclosure is not limited at all to the details of the vehicle 10 described herein and/or depicted in the drawings.

The vehicle 10 is depicted as including a tractor 12 and a trailer 14. However, it is contemplated that the principles of this disclosure can be incorporated into a trailer of any type (as well as other types of vehicles), and so the term "vehicle" is used herein to refer to trailers of various types, as well as to refer to self-propelled vehicles.

The trailer 14 of FIG. 1 includes multiple suspension systems 16 which suspend a frame 18 of the trailer above a road surface. Wheels 20 and tires 22 are rotatably mounted at each end of each suspension system 16. None, any or all of the suspension systems 16 may be liftable (so that the wheels 20 can be raised out of contact with a road surface).

Figure 2:
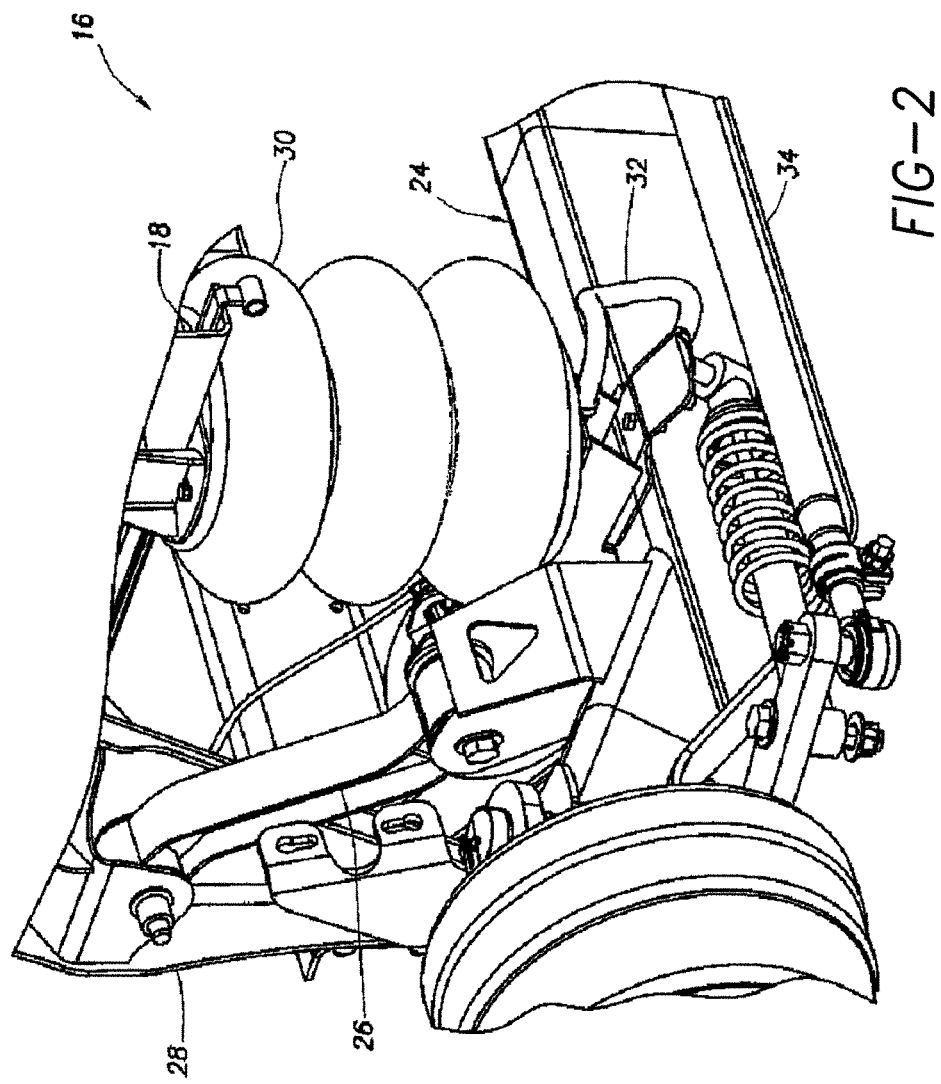
FIG. 2 is a representative perspective view of a suspension system which may be used in the vehicle of FIG. 1.

Referring additionally now to FIG. 2, an example of one of the suspension systems 16 is representatively illustrated. Only one lateral side of the suspension system 16 is depicted in FIG. 2, it being understood that an opposite side of the suspension system is substantially a mirror-image of the portion depicted in FIG. 2.

In this example, the suspension system 16 includes a laterally extending axle 24. The wheels 20 and tires 22 (not visible in FIG. 2, see FIG. 1) are rotatably mounted at opposite ends of the axle 24, for example, with conventional hubs, spindles, bearings, king pins (if the suspension system 16 is steerable), etc.

The suspension system 16 example depicted in FIG. 2 is steerable, with a fabricated liftable axle pivotably connected by parallel or semi-parallel arms 26 to hanger brackets 28, also known as hangers, attached to the frame 18, but other types of suspension systems may be used. For example, spring beam, non-liftable, non-steerable, solid axle, and other types of suspension systems can benefit from the principles of this disclosure. Thus, the scope of this disclosure is not limited to use with any particular type of suspension system.

An air spring 30 applies an upwardly biasing force to the frame 18, thereby suspending the frame over the axle 24. In this example, the air spring 30 is a convoluted air spring and has an internal air volume which is connected to an internal volume of the axle 24 (e.g., via a hose 32 and a flow control device not visible in FIG. 2). Thus, the axle 24 comprises an external air reservoir, which can be used to control damping characteristics of the air spring 30, as described more fully below.

Typically, a convoluted air spring is used in situations where long travel and low compressed height are desired. As such, the internal air volume of a convoluted air spring is usually insufficient to provide a suitable damping air reservoir in the air spring.

In the FIG. 2 example, the external air reservoir provided by the axle 24 solves the problem of insufficient volume within the air spring 30, and conveniently utilizes the existing axle component. However, it should be clearly understood that the scope of this disclosure is not limited to use with any particular type of air spring or external air reservoir.

Figure 3:
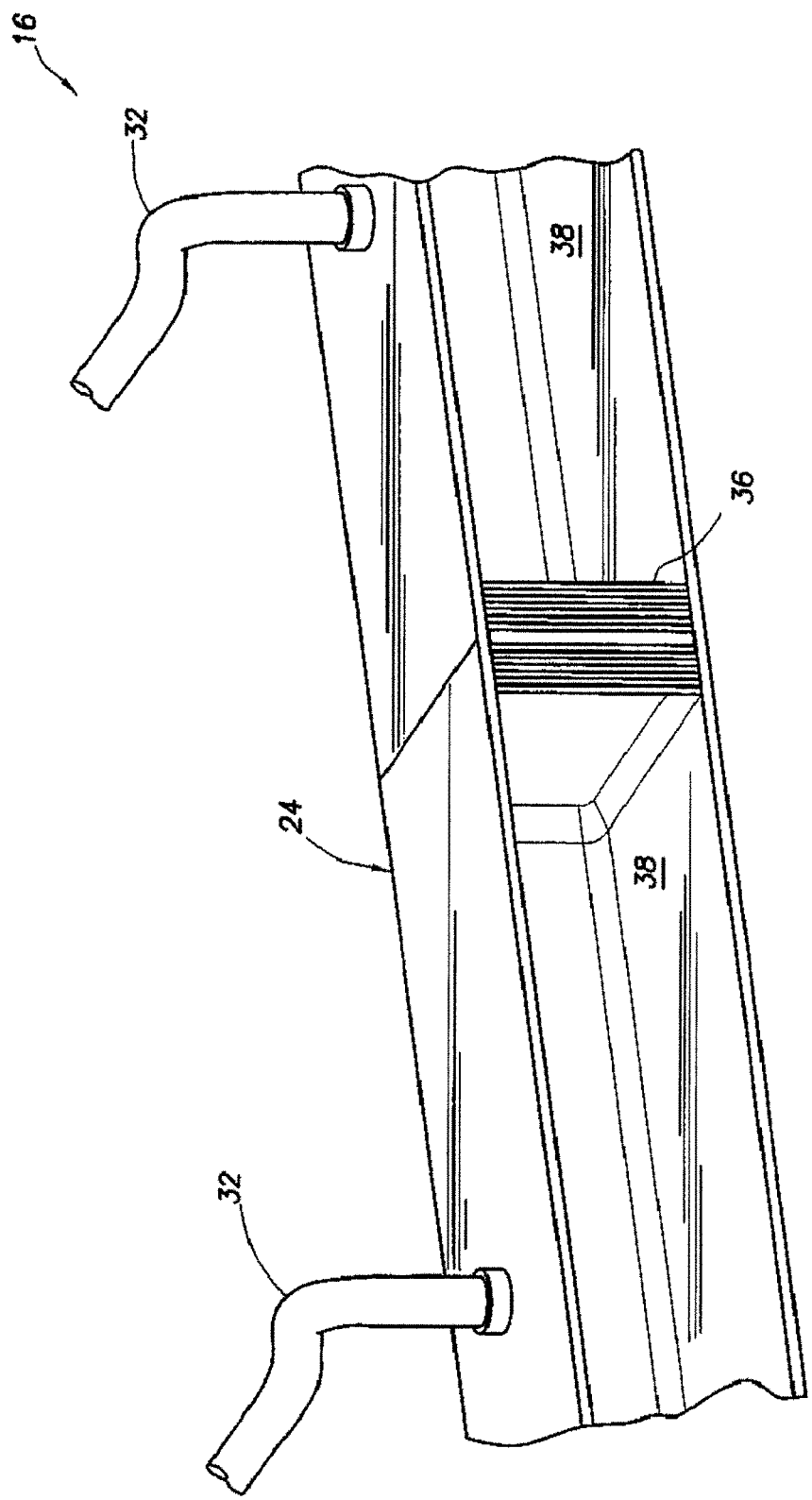
FIG. 3 is a representative perspective view of a center section of an axle of the suspension system.
Figure 8B:
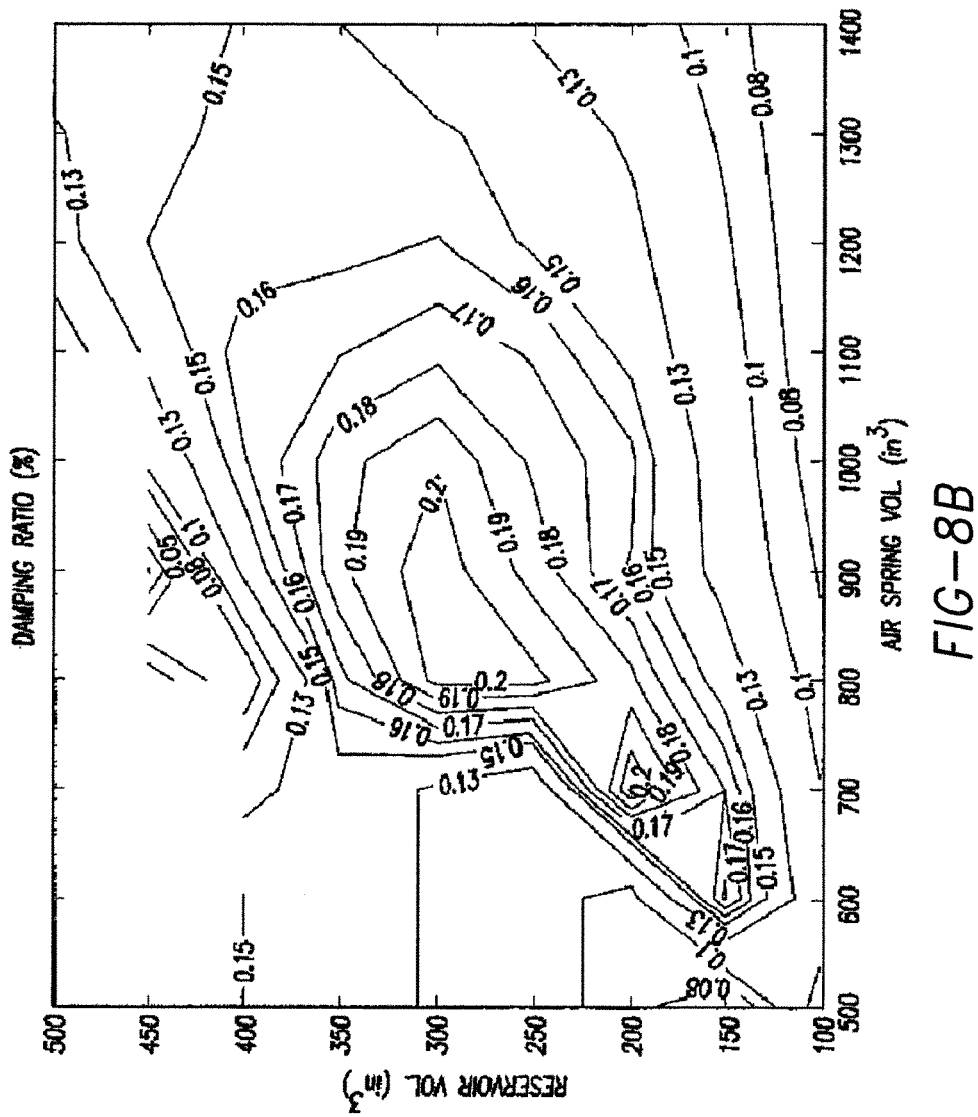
Figure 8C:
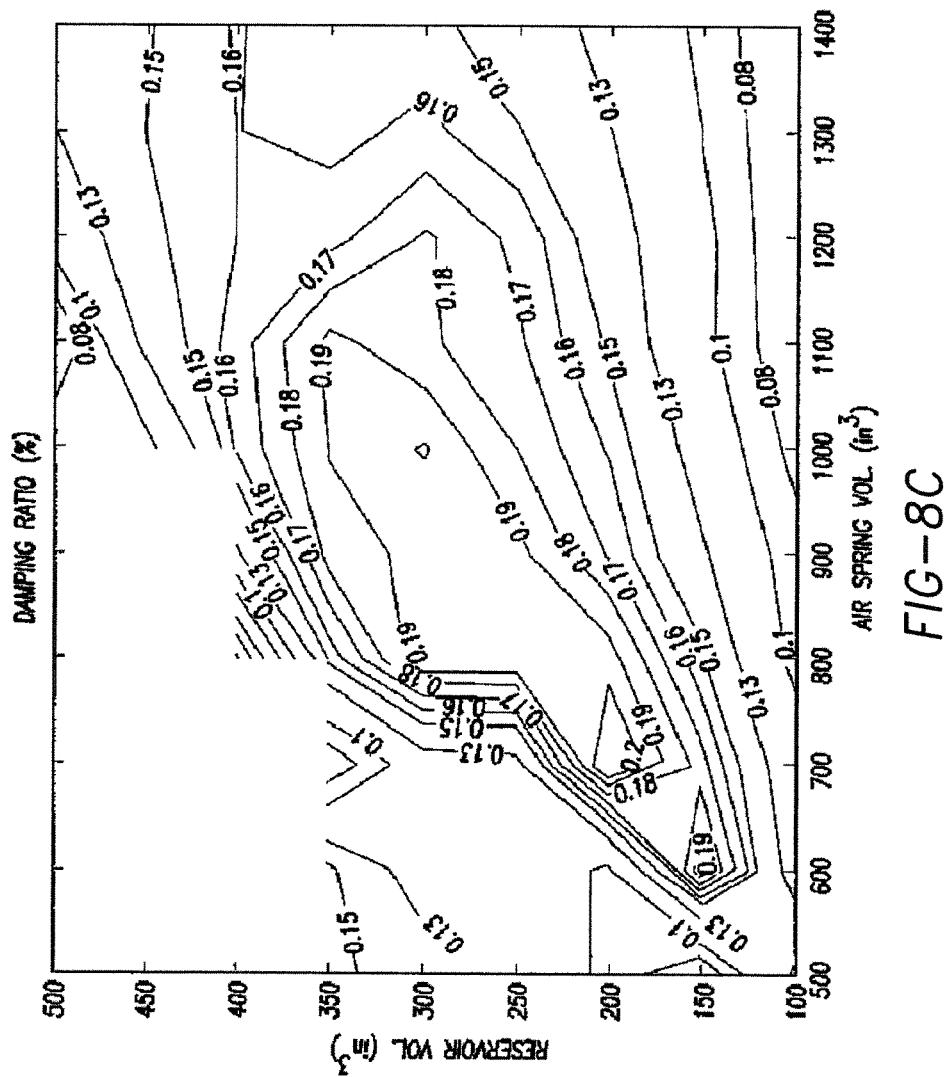
Figure 8E:
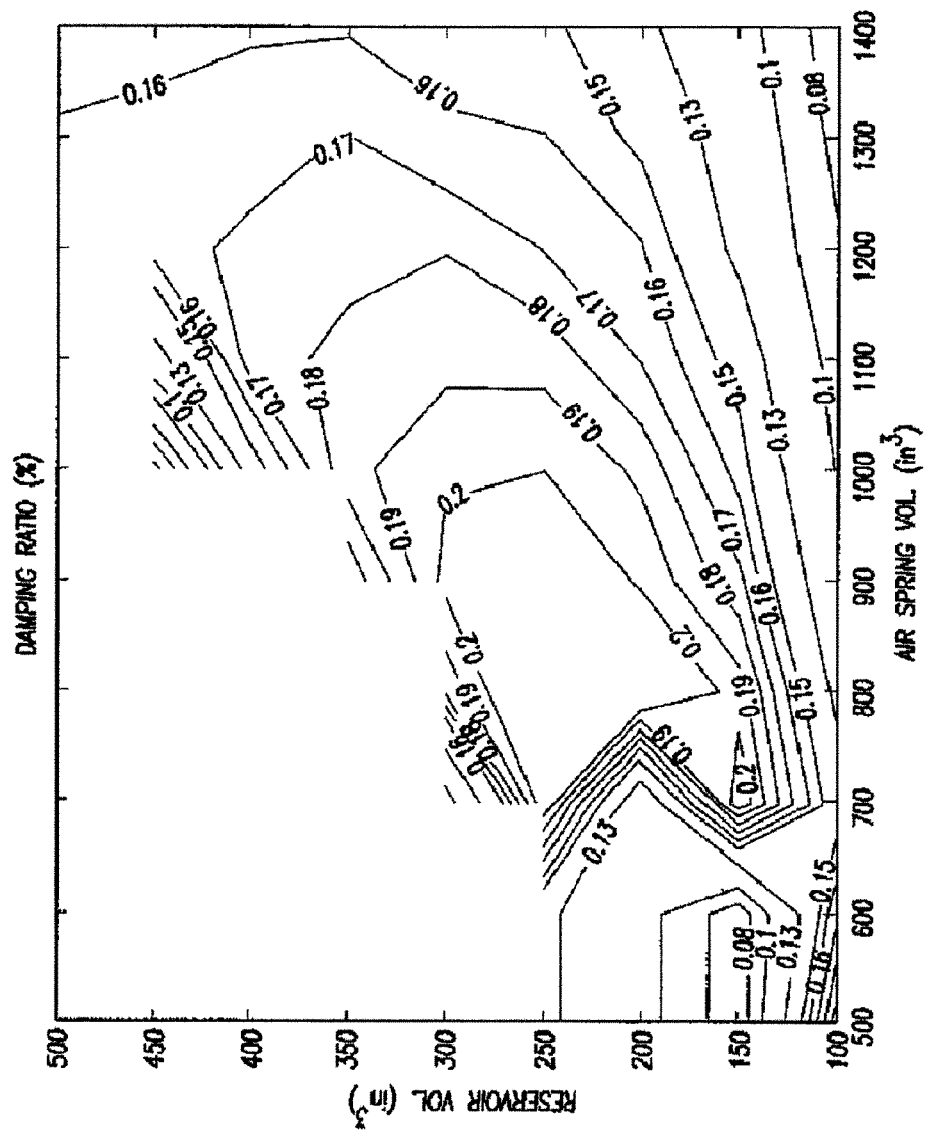
Figure 8F:
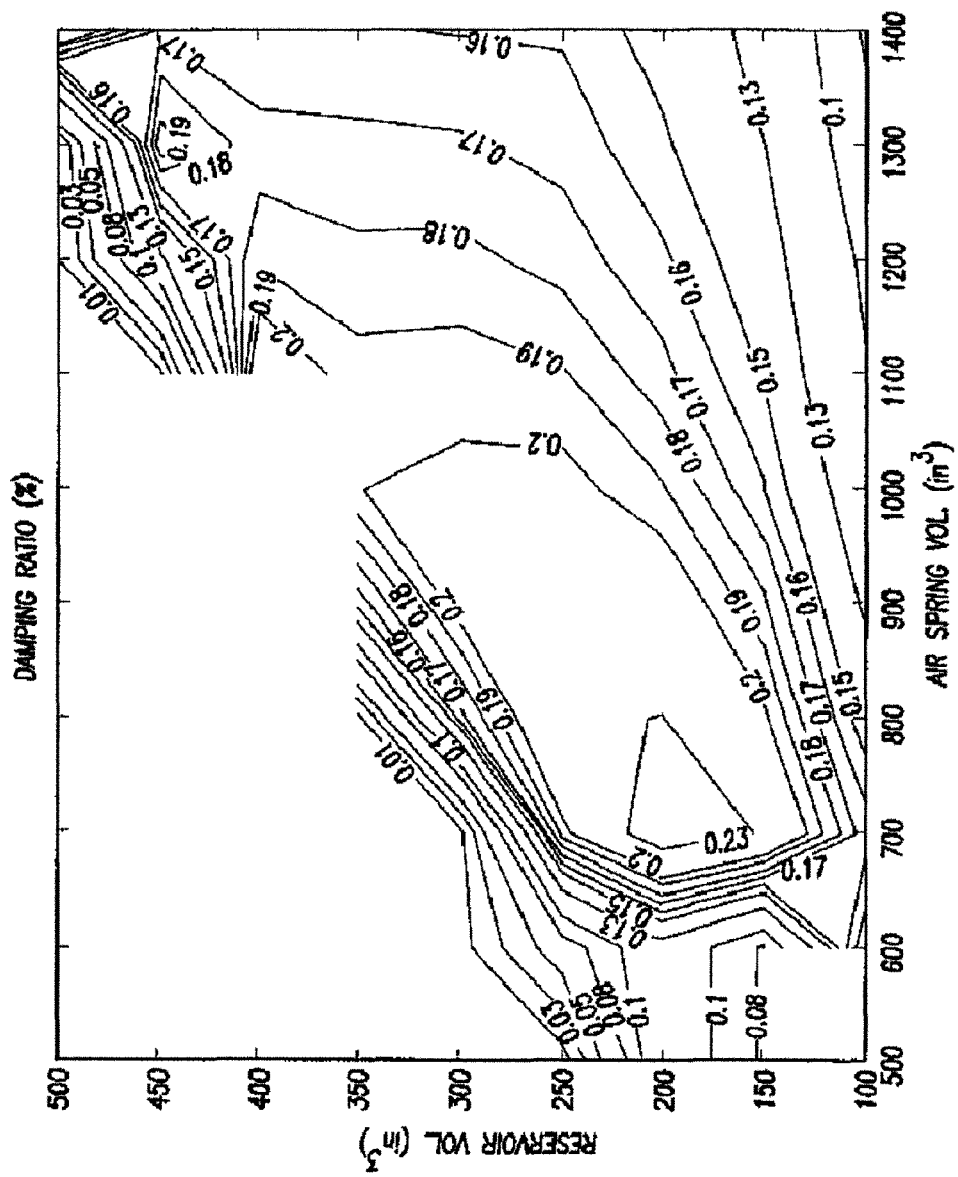

Referring additionally now to FIG. 3, the axle 24 is representatively illustrated, apart from the remainder of the suspension system 16. A perspective bottom view of the axle 24 is depicted in FIG. 3, with a bottom plate 34 (not shown in FIG. 3, see FIG. 2) removed.

In this view it may be seen that the interior of the axle 24 is generally hollow. A partition 36 separates individual air reservoirs 38 in the axle 24. One of the air reservoirs 38 is connected to a corresponding one of the air springs 30 via a hose 32, and the other of the air reservoirs is connected to a corresponding other one of the air springs via another hose.

By isolating the air reservoirs 38 from each other in the axle 24, changes in pressure in one reservoir will not affect pressure in the other reservoir. This prevents one air spring's dynamics from affecting the other air spring during compliance of the suspension system 16 (e.g., when the axle 24 displaces relative to the frame 18 and the air spring 30 compresses or elongates). Alternatively, it is contemplated that the air reservoirs could be in fluid communication with each other so that changes in pressure in one reservoir would affect the pressure in the other reservoir, thus allowing one air spring's dynamics to affect the other air spring during compliance of the suspension system, without changing the overall concept or operation of the present invention.

In one example, the partition 36 could be made of a material (such as plastic, soft metal, etc.) which will soften when the bottom plate 34 is welded to the rest of the axle 24, thereby heating the axle and partition. In this manner, the partition 36 can conform to an interior surface of the axle 24, so that the air reservoirs 38 are better isolated from each other.

However, other materials and other techniques for isolating the air reservoirs 38 from each other may be used, in keeping with the scope of this disclosure. For example, an elastomer could be provided on the partition 38 for sealing against the interior surface of the axle 24, the partition could be welded, bonded or molded into the axle, etc.

Referring additionally now to FIG. 4, a cross-sectional view of the suspension system 16 is representatively illustrated. In this view it may be seen that a flow control device 40 controls flow of air between the corresponding air reservoir 38 in the axle 24 and an internal air volume 42 of the air spring 30.

Although the device 40 is depicted in FIG. 4 as being positioned internal to the air spring 30 and between the internal air volume 42 and the hose 32, it will be appreciated that these positions could be changed if desired. For example, the device 40 could be external to the air spring 30, internal to the axle 24, at an interface between the air spring and the axle, at an opposite end of the hose 32, etc. Thus, the scope of this disclosure is not limited to any particular configuration or arrangement of the device 40 with respect to other components of the suspension system 16.

In one example, the device 40 can variably restrict flow of air between the internal air volume 42 and the reservoir 38, to thereby beneficially affect the damping characteristics of the suspension system 16. For example, the device 40 can maintain up to a threshold pressure differential between the internal air volume 42 and the reservoir 38 in either direction of flow, as described more fully below.

Referring additionally now to FIG. 5, another example of the suspension system 16 is representatively illustrated. In this example, the device 40 is connected substantially directly between the air spring internal air volume 42 and the reservoir 38, without use of the hose 32.

The hose 32 can affect the damping characteristics of the suspension system 16. For a particular suspension system, a particular hose configuration (e.g., diameter, length) can be selected to achieve a desired damping, or to at least maximize damping. The FIG. 5 example does not make use of the hose 32, and so the damping characteristics in this example will depend substantially on a construction of the device 40 and a relationship between the reservoir 38 volume and the internal air volume 42 of the air spring 30.

Referring additionally now to FIG. 6, an enlarged scale cross-sectional view of an example of the flow control device 40 is representatively illustrated. The device 40 may be used in the suspension system 16 described above, or it may be used in other suspension systems.

In the FIG. 6 example, a pressure differential is applied from the air spring internal air volume 42 to the reservoir 38. When the pressure differential reaches a predetermined threshold level, a resilient plate 44 which previously blocked flow through openings 46 will deflect, thereby permitting air 48 to flow from the air spring internal air volume 42 to the reservoir 38 via the openings 46, for example, during compliance of the suspension system 16.

The plate 44, openings 46 and/or other components of the device 40 may be configured so that the predetermined pressure differential is maintained as the air 48 flows through the device. Thus, a velocity of the air 48 may change, and the plate 44 may deflect differently at different velocities of the air, but the pressure differential from the volume 42 to the reservoir 38 can remain substantially unchanged. However, at least the threshold level of pressure differential is required to open the device 40.

Of course, other configurations of the device 40 may be used in keeping with the scope of this disclosure. For example, it is not necessary for the pressure differential across the device 40 to remain substantially unchanged while the air 48 flows through the device, it is not necessary for the plate 44 to be used (other closure members, such as plugs, balls, etc., may be used instead), etc. Thus, the scope of this disclosure is not limited to the construction and operation of the device 40 as depicted in the drawings and described herein.

Referring additionally now to FIG. 7, another configuration of the device 40 is representatively illustrated. Note that the cross-sectional view depicted in FIG. 7 is rotated 45 degrees about a vertical axis of the device 40 as compared to FIG. 6, so that openings 52 in the device are visible (however, openings 46 depicted in FIG. 6 are not visible in FIG. 7).

In the FIG. 7 configuration, the air 48 flows from the reservoir 38 to the air spring internal air volume 42 in response to a predetermined threshold level of pressure differential being applied across the device 40 from the reservoir to the air spring internal air volume. A resilient plate 50 deflects due to the pressure differential, thereby permitting flow through the openings 52.

Similar to the FIG. 6 configuration, the plate 50, openings 52 and/or other components of the device 40 may be configured so that the predetermined pressure differential is maintained as the air 48 flows through the device in the FIG. 7 configuration. Thus, a velocity of the air 48 may change, and the plate 50 may deflect differently at different velocities of the air, but the pressure differential from the reservoir 38 to the volume 42 can remain substantially unchanged. However, at least the threshold level of pressure differential is required to open the device 40.

The threshold pressure differential to allow flow from the reservoir 38 to the volume 42 in the FIG. 7 configuration may be the same as, or substantially the same as, the threshold pressure differential to allow flow from the volume 42 to the reservoir 38 in the FIG. 6 configuration, or the threshold pressure differentials may be different. For example, it may be desired to have different damping characteristics for when the air spring 30 is compressing, and for when the air spring is elongating.

Referring additionally now to FIGS. 8A-F, representative graphs are illustrated for a modeled suspension system 16. The FIGS. 8A-F graphs depict damping ratio (expressed as a percentage) versus reservoir 38 volume and air spring internal air volume 42 for various axle loads (30,000 lb., 25,000 lb., 20,000 lb., 13,000 lb., 10,000 lb. and 8,000 lb. axle loads, respectively).

Careful consideration of the FIGS. 8A-F graphs will reveal that maximum damping ratio is achieved when a ratio of reservoir 38 volume to air spring 30 volume is in a range of about 1:2.5 to about 1:6. For example, in FIG. 8A, for a 30,000 lb. axle 24 loading, if the air spring 30 volume is 600 in$^3$, then maximum damping is achieved when the reservoir 38 volume is about 150 in$^3$ (a 1:4 ratio). Similarly, in FIG. 8F, for an 8,000 lb. axle 24 loading, if the air spring 30 volume is 750 in$^3$, then maximum damping is achieved when the reservoir 38 volume is about 200 in$^3$ (a 1:3.75 ratio).

The inventor has found that maximum damping is achieved when the ratio of the reservoir 38 volume to the air spring internal air volume 42 is greater than about 1:2.5.

Preferably, the ratio is between about 1:2.5 and about 1:6. Most preferably, the ratio is between about 1:3 and about 1:5.

Note that the air spring internal air volume 42 can change during suspension system compliance (e.g., as the air spring 30 compresses or elongates). Thus, the air spring internal air volume 42 used above for calculation of the ratio of reservoir to air spring volumes is the steady state (substantially no displacement of the axle 24 relative to the frame 18) internal air volume of the air spring 30 at run height.

It may now be fully appreciated that the above disclosure provides significant advancements to the art of damping vehicle suspension systems which use air springs. The reservoir 38 can be conveniently provided in the axle 24, and the ratio of reservoir volume to air spring volume can be tailored to achieve a desired damping, or to at least maximize damping of the suspension system 16.

In one example, a suspension system 16 is provided to the art, which suspension system includes at least one air spring 30, at least one air reservoir 38 external to the air spring 30, and at least one flow control device 40 which variably restricts flow of air 48 between the air spring 30 and the air reservoir 38.

The air spring 30 may have an internal air volume 42 at least 2½ times as great as a volume of the air reservoir 38. A ratio of a volume of the air reservoir 38 to an internal air volume 42 of the air spring 30 can be in a range of approximately 1:2.5 to approximately 1:6.

The air reservoir 38 can be internal to an axle 24 of the suspension system 16. The suspension system 16 can comprise multiple air reservoirs 38 internal to the axle 24, with the air reservoirs being isolated from each other in the axle.

A partition 36 may separate the air reservoirs 38 in the axle 24. The partition 36 may conform to an internal surface of the axle 24 in response to heating of the axle (for example, when welding the bottom plate 34 of the axle).

The flow control device 40 may permit flow from the air spring 30 to the air reservoir 38 when a pressure differential across the device 40 reaches a predetermined level. The flow control device 40 may permit flow from the air reservoir 38 to the air spring 30 when a pressure differential across the device 40 reaches a predetermined level.

The flow control device 40 may permit flow from the air spring 30 to the air reservoir 38 when a pressure differential across the device 40 reaches a first predetermined level, and the flow control device 40 may permit flow from the air reservoir 38 to the air spring 30 when the pressure differential across the device 40 reaches a second predetermined level.

The flow control device 40 may open in response to a predetermined pressure differential level between the air spring 30 and the air reservoir 38.

A suspension system 16 described above can include at least one air spring 30, and at least one air reservoir 38 external to the air spring 30, flow between the air spring 30 and the air reservoir 38 being permitted in response to compliance of the suspension system 16. The air spring 30 has an internal air volume 42 at least 2½ times as great as a volume of the air reservoir 38.

A suspension system 16 described above can include at least one air spring 30, at least one air reservoir 38 external to the air spring 30, and at least one flow control device 40 connected between the air spring 30 and the air reservoir 38. The flow control device 40 permits flow between the air spring 30 and the air reservoir 38 in response to at least one predetermined pressure differential level across the flow control device 40.

A suspension system 16 described above can include multiple air springs 30, multiple air reservoirs 38, each of the reservoirs 38 being connected to a respective one of the air springs 30, and an axle 24. The air reservoirs 38 are internal to the axle 24 and are isolated from each other in the axle 24.

Turning now to FIGS. 9-11A, a first preferred embodiment suspension system of the present invention, including an external air reservoir volume 105 incorporated into each one of the beams of respective suspension assemblies of the suspension system, is shown at reference numeral 100 and will now be described in detail below. Suspension system 100 includes a pair of suspension assemblies 114 that are transversely spaced from one another and capture an axle 137 in a manner well known in the art. Because suspension assemblies 114 are generally mirror images of one another, for purposes of clarity and conciseness, only a single suspension assembly will be described below.

Suspension assembly 114 includes a longitudinally extending elongated beam 118. Beam 118 is formed having a generally upside-down integrally formed U-shape with a pair of sidewalls 166 and a top plate 165, with the open portion of the beam facing generally downwardly. A bottom plate 167 extends between and is attached to the lowermost ends of sidewalls 166 by any suitable means such as welding to complete the structure of beam 118. Beam 118 is located adjacent to and below a respective one of a pair of spaced-apart longitudinally extending main members (not shown) and one or more cross members (not shown), which form the frame of the vehicle. More specifically, beam 118 includes a front end 122 having a bushing assembly 121, which includes a bushing, pivot bolts and washers as are well known in the art, to facilitate pivotal connection of the beam to a hanger bracket 116, which in turn is attached to and depends from a respective one of the main members (not shown) of the vehicle. Beam 118 also includes a rear end 126, which is welded or otherwise rigidly attached to transversely extending axle 137.

Suspension assembly 114 also includes an air spring 124, mounted on and extending between beam rear end 126 and the main member of the vehicle (not shown). Air spring 124 includes a bellows 141 and piston 142. The top portion of bellows 141 is sealingly engaged with a bellows top plate 143. An air spring mounting plate 144 is mounted on top plate 143 by fasteners/air inlets 145, which are also used to mount the top portion of air spring 124 to the vehicle main member (not shown). Piston 142 is generally cylindrically shaped and has a generally flat bottom plate 146 and top plate (not shown). Piston bottom plate rests on a pedestal 148 which is attached at main member rear end 126 in a manner well known in the art, such as by fasteners.

Figure 10:
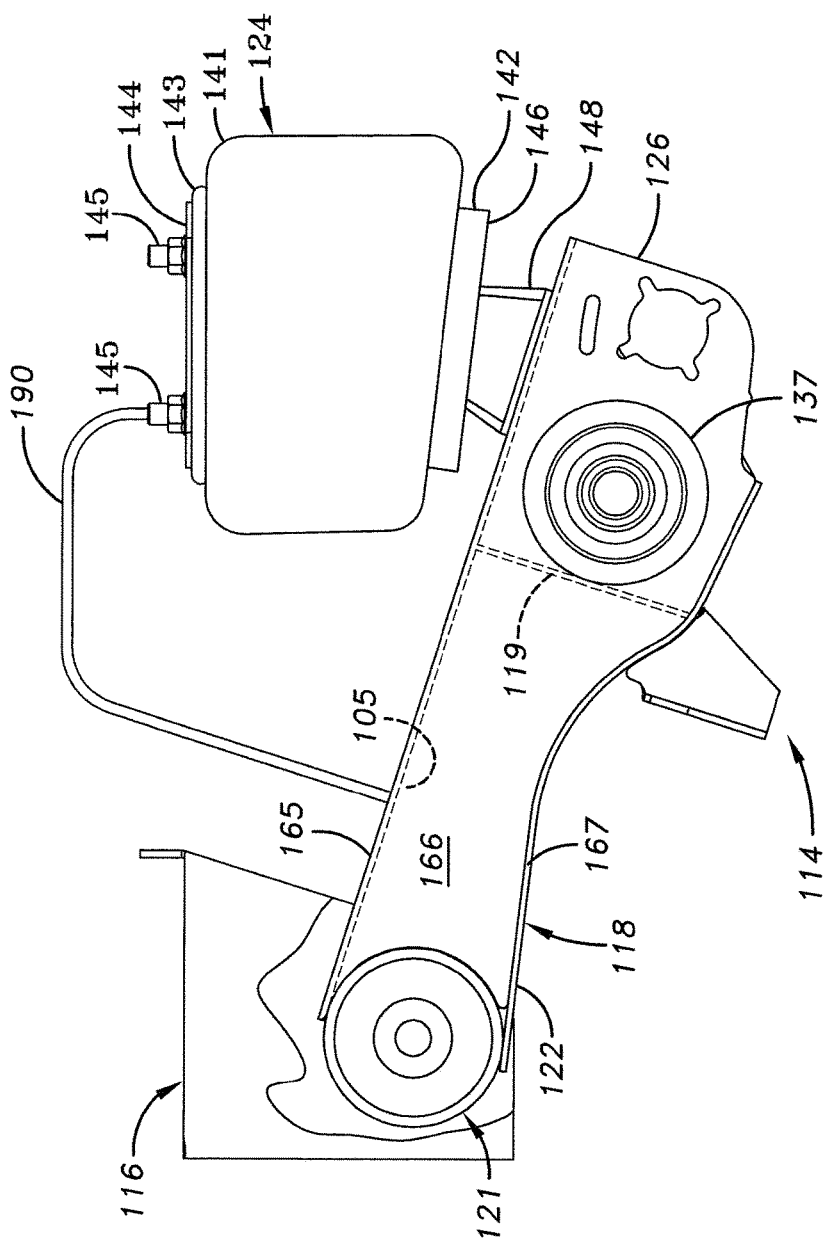
FIG. 10 is a representative side view of one of the beams of the first preferred embodiment suspension system shown in FIG. 9 with portions of the hanger removed and with hidden portions represented by broken lines, showing the external reservoir volume incorporated into the beam.
Figure 11A:
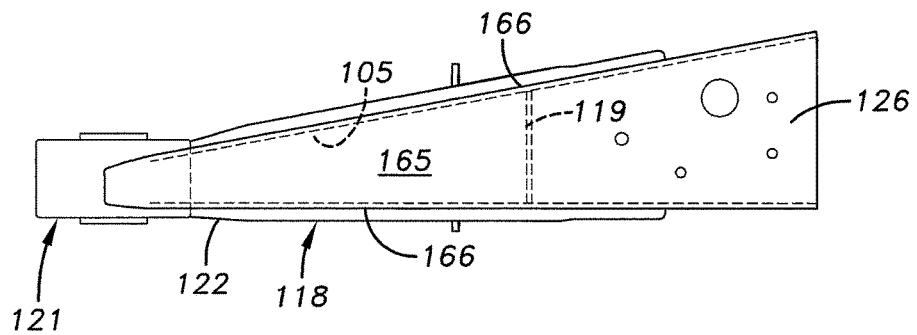
FIG. 11A is a representative top view of the beam shown in FIG. 11, with hidden portions represented by broken lines.
Figure 11:
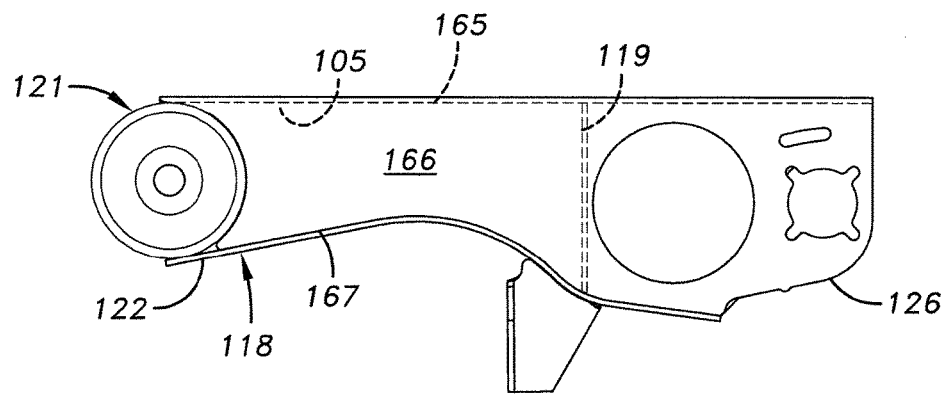
FIG. 11 is an enlarged representative side view of the driver side beam shown in FIG. 10 removed from the hanger, with the air spring and axle removed and with hidden portions represented by broken lines.
Figure 12:
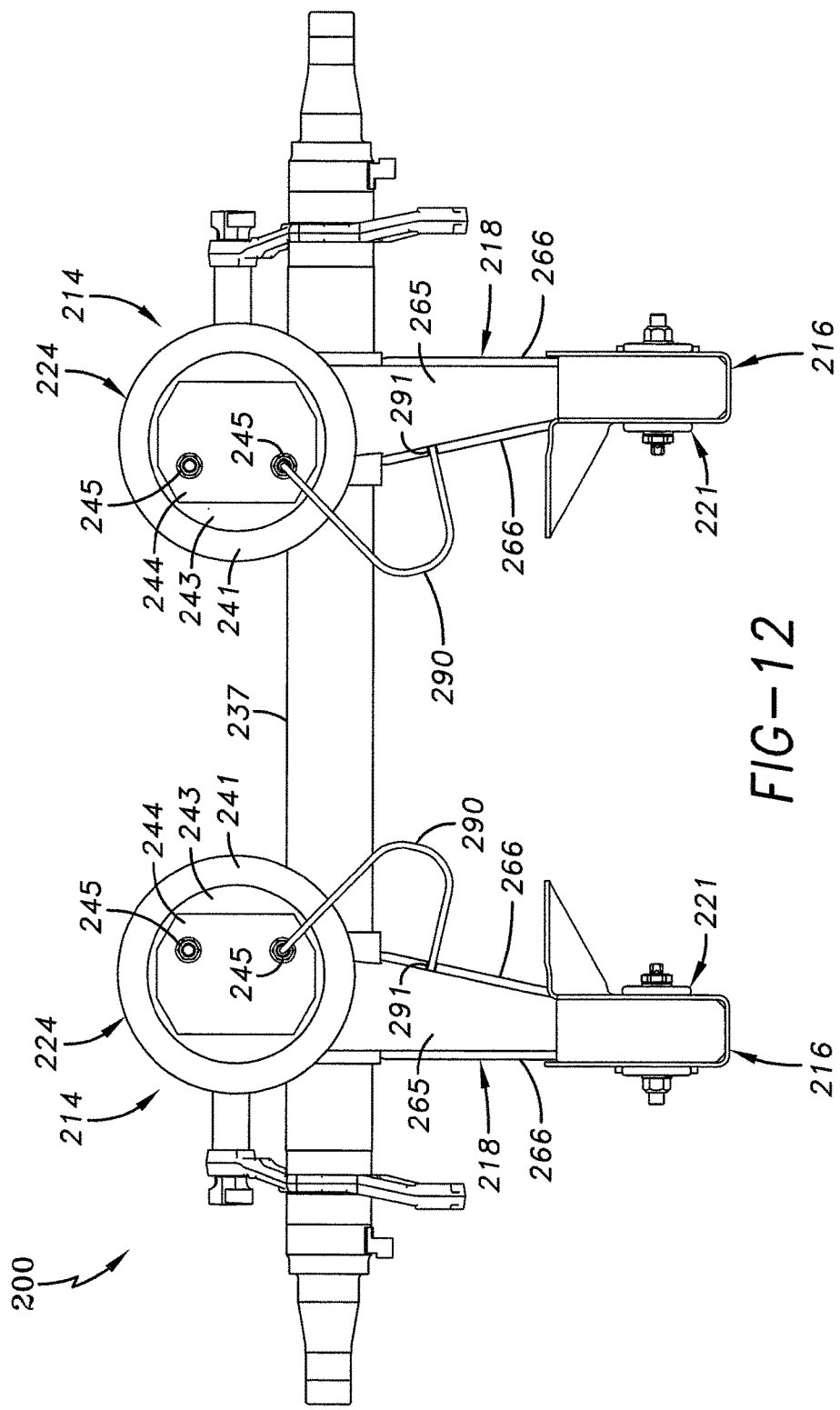
FIG. 12 is a representative top view of a second preferred embodiment suspension system of the present invention which may be used in the vehicle of FIG. 1, showing the external air reservoir volume incorporated into a tank that is inserted into each one of the beams of respective suspension assemblies of the suspension system.

With continued reference to FIGS. 10 and 11, an important aspect of first preferred embodiment suspension system 100 of the present invention now will be described. Beam 118 includes an internal rear plate 119 located adjacent to the front portion of axle 137. Internal rear plate 119 is attached to beam sidewalls 166, beam top plate 165 and beam bottom plate 167 so that air reservoir 105 is formed in the beam. Air reservoir 105 is in fluid communication with air spring bellows 141 via a hose 190 that is fluidly connected to the reservoir through inboard sidewall 166 of beam 118 via fastener 191 and which is fluidly connected to air spring 124 via fastener 145.

Air reservoir 105 serves as an external reservoir volume as described above and provides damping characteristics to air spring 124 during operation of the vehicle.

Turning now to FIGS. 12-14A, a second preferred embodiment suspension system of the present invention, including an external air reservoir volume 205 incorporated into a tank 270 that is inserted into the beam of respective suspension assemblies of the suspension system, is shown at reference numeral 200 and will now be described in detail below. Suspension system 200 includes a pair of suspension assemblies 214 that are transversely spaced from one another and capture an axle 237 in a manner well known in the art. Because suspension assemblies 214 are generally mirror images of one another, for purposes of clarity and conciseness, only a single suspension assembly will be described below.

Suspension assembly 214 includes a longitudinally extending elongated beam 218. Beam 218 is formed having a generally upside-down integrally formed U-shape with a pair of sidewalls 266 and a top plate 265, with the open portion of the beam facing generally downwardly. A bottom plate 267 extends between and is attached to the lowermost ends of sidewalls 266 by any suitable means such as welding to complete the structure of beam 218. Beam 218 is located adjacent to and below a respective one of a pair of spaced-apart longitudinally extending main members (not shown) and one or more cross members (not shown), which form the frame of the vehicle. More specifically, beam 218 includes a front end 222 having a bushing assembly 221, which includes a bushing, pivot bolts and washers as are well known in the art, to facilitate pivotal connection of the beam to a hanger bracket 216, which in turn is attached to and depends from a respective one of the main members (not shown) of the vehicle. Beam 218 also includes a rear end 226, which is welded or otherwise rigidly attached to transversely extending axle 237.

Suspension assembly 214 also includes an air spring 224, mounted on and extending between beam rear end 226 and the main member of the vehicle (not shown). Air spring 224 includes a bellows 241 and piston 242. The top portion of bellows 241 is sealingly engaged with a bellows top plate 243. An air spring mounting plate 244 is mounted on top plate 243 by fasteners/air inlets 245, which are also used to mount the top portion of air spring 224 to the vehicle main member (not shown). Piston 242 is generally cylindrically shaped and has a generally flat bottom plate 246 and top plate (not shown). Piston bottom plate rests on a pedestal 248 which is attached at beam rear end 226 in a manner well known in the art, such as by fasteners.

Figure 13:
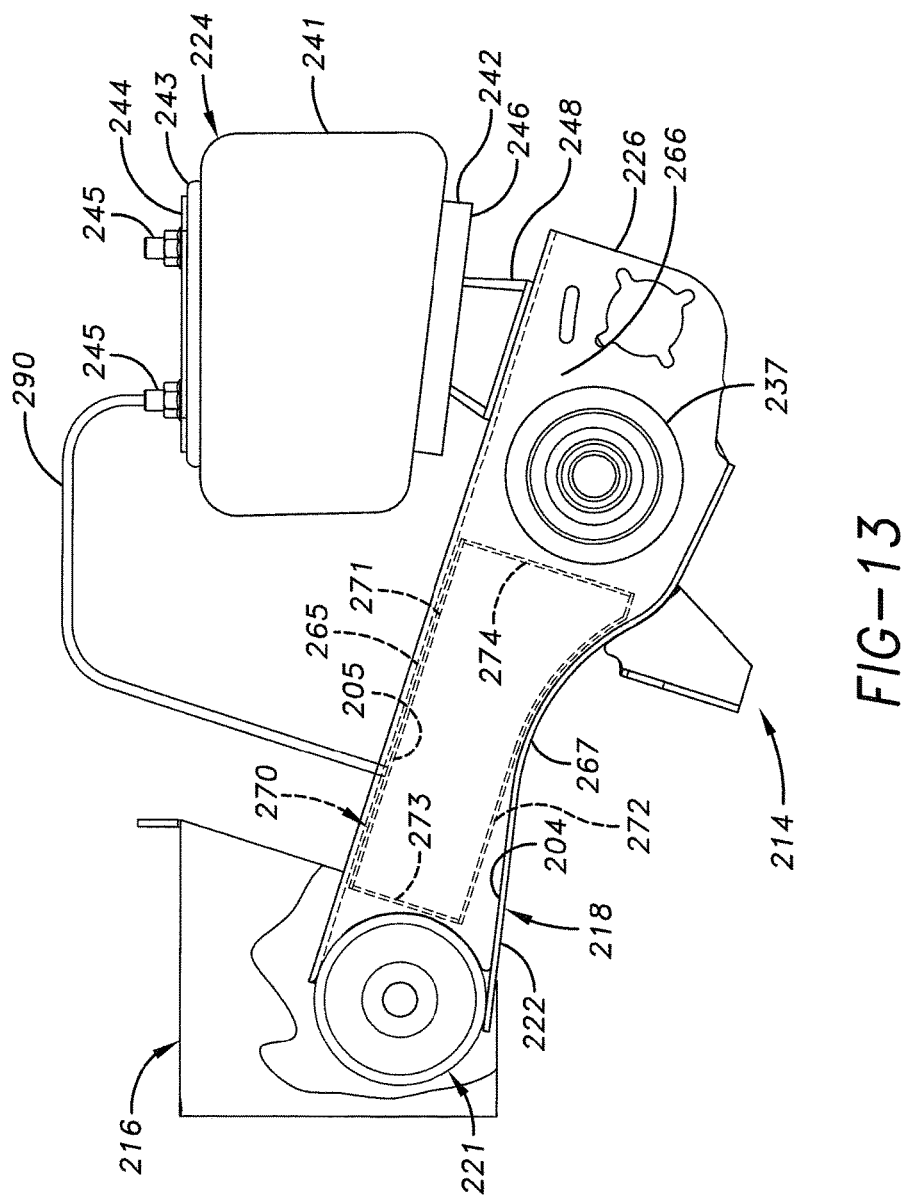
FIG. 13 is an enlarged representative side view of one of the beams of the second preferred embodiment suspension system shown in FIG. 12 with portions of the hanger removed and with hidden portions represented by broken lines, showing the external air reservoir volume incorporated into a tank that is disposed within the beam of the suspension system.
Figure 14A:
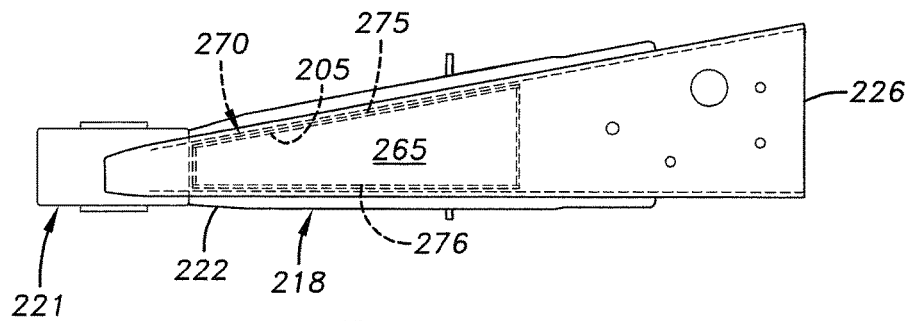
FIG. 14A is a representative top view of the beam shown in FIG. 14, with hidden portions represented by broken lines.
Figure 14:
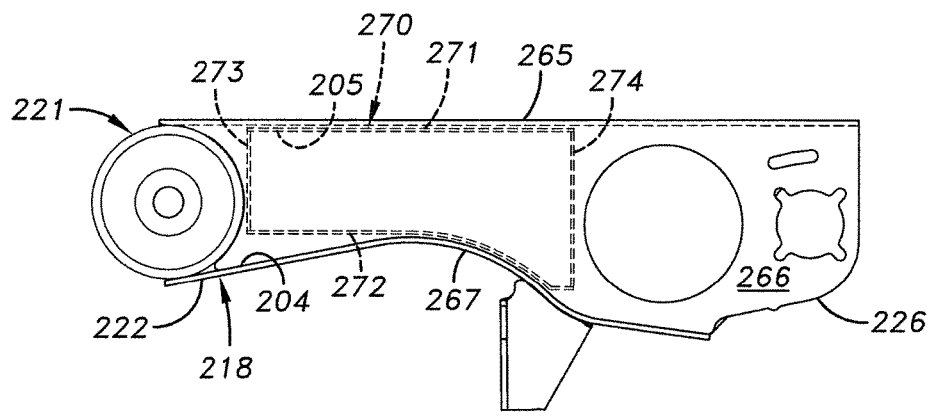
FIG. 14 is an enlarged representative side view of the driver side beam shown in FIG. 12 removed from the hanger, with the air spring and axle removed and with hidden portions represented by broken lines.

With continued reference to FIGS. 13-14A, an important aspect of second preferred embodiment suspension system 200 of the present invention now will be described. Beam 218 includes an air reservoir tank 270 disposed within a cavity 204, which is defined by top plate 265, sidewalls 266 and bottom plate 267 of the beam, adjacent to the front portion of axle 237. Air reservoir tank 270 is a generally box-like structure having a top wall 271, a bottom wall 272, a pair of end walls 273,274 and a pair of sidewalls 275,276 forming air reservoir 205. Air reservoir 205 is in fluid communication with air spring bellows 241 via a hose 290 that is fluidly connected to the reservoir through inboard sidewall 266 of beam 218 via fastener 291 and which is fluidly connected to air spring 224 via fastener 245.

Reservoir 205 serves as an external reservoir volume as described above and provides damping characteristics to air spring 224 during operation of the vehicle.

Figure 15:
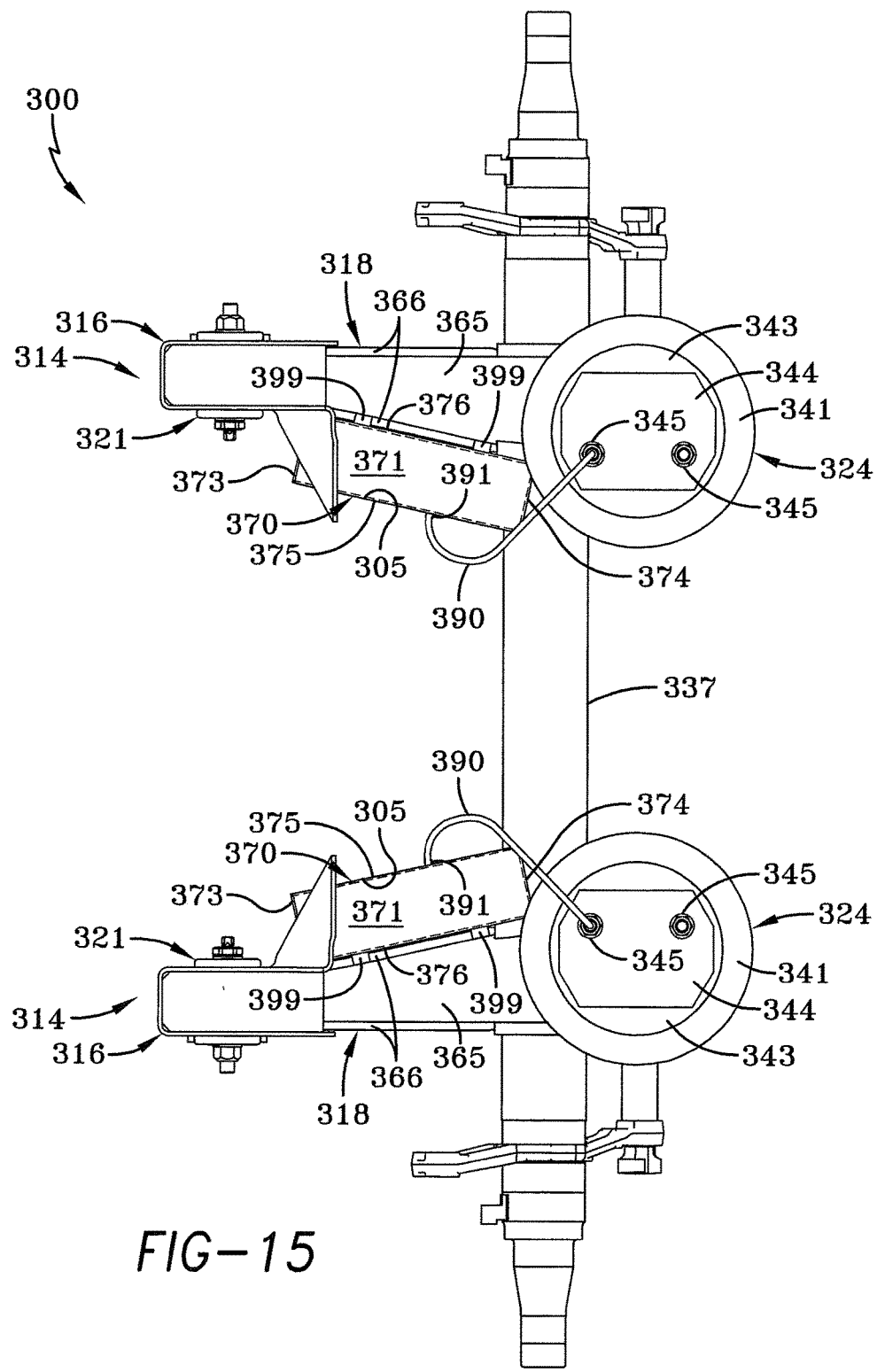
FIG. 15 is a representative top view of a third preferred embodiment suspension system of the present invention which may be used in the vehicle of FIG. 1, with hidden portions represented by broken lines, showing the external air reservoir volume incorporated into a tank that is disposed and mounted on the inboard side of its respective beam and suspension assembly of the suspension system.
Figure 16:
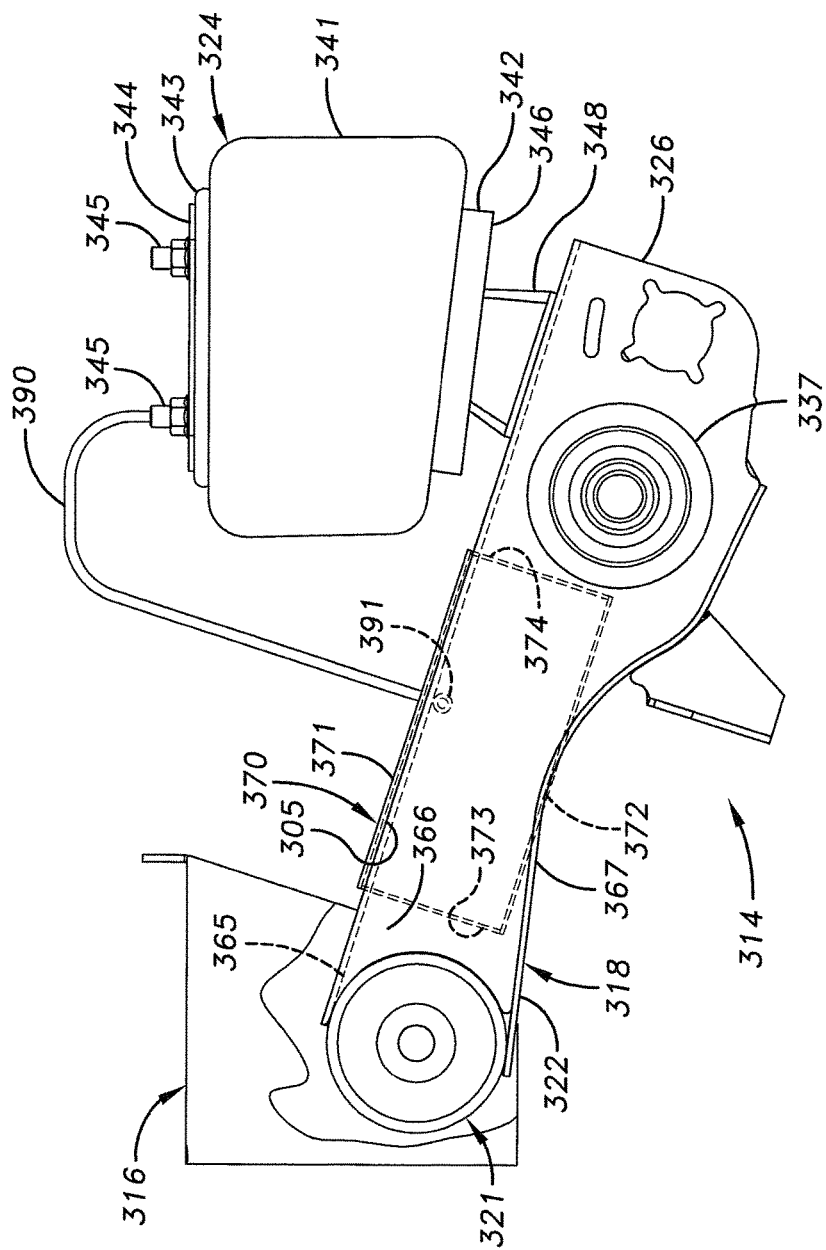
FIG. 16 is an enlarged representative side view of one of the beams of the third preferred embodiment suspension system shown in FIG. 15 with hidden portions represented by broken lines and with portions of the hanger removed, showing the external air reservoir volume incorporated into a tank that is disposed and mounted on the inboard side of the beam of the suspension assembly of the suspension system.

Turning now to FIGS. 15 and 16, a third preferred embodiment suspension system of the present invention, including an external air reservoir volume 305 incorporated into a tank 370 that is disposed and mounted on the inboard side of each beam of respective suspension assemblies of the suspension system, is shown at reference numeral 300 and will now be described in detail below. Suspension system 300 includes a pair of suspension assemblies 314 that are transversely spaced from one another and capture an axle 337 in a manner well known in the art. Because suspension assemblies 314 are generally mirror images of one another, for purposes of clarity and conciseness, only a single suspension assembly will be described below.

Suspension assembly 314 includes a longitudinally extending elongated beam 318. Beam 318 is formed having a generally upside-down integrally formed U-shape with a pair of sidewalls 366 and a top plate 365, with the open portion of the beam facing generally downwardly. A bottom plate 367 extends between and is attached to the lowermost ends of sidewalls 366 by any suitable means such as welding to complete the structure of beam 318. Beam 318 is located adjacent to and below a respective one of a pair of spaced-apart longitudinally extending main members (not shown) and one or more cross members (not shown), which form the frame of the vehicle. More specifically, beam 318 includes a front end 322 having a bushing assembly 321, which includes a bushing, pivot bolts and washers as are well known in the art, to facilitate pivotal connection of the beam to a hanger bracket 316, which in turn is attached to and depends from a respective one of the main members (not shown) of the vehicle. Beam 318 also includes a rear end 326, which is welded or otherwise rigidly attached to transversely extending axle 337.

Suspension assembly 314 also includes an air spring 324, mounted on and extending between beam rear end 326 and the main member of the vehicle (not shown). Air spring 324 includes a bellows 341 and piston 342. The top portion of bellows 341 is sealingly engaged with a bellows top plate 343. An air spring mounting plate 344 is mounted on top plate 343 by fasteners/air inlets 345, which are also used to mount the top portion of air spring 324 to the vehicle main member (not shown). Piston 342 is generally cylindrically shaped and has a generally flat bottom plate 346 and top plate (not shown). Piston bottom plate rests on a pedestal 348 which is attached at beam rear end 326 in a manner well known in the art, such as by fasteners.

With continued reference to FIGS. 15 and 16, an important aspect of third preferred embodiment suspension system 300 of the present invention now will be described. Beam 318 includes an air reservoir tank 370 disposed adjacent inboard sidewall 366 via fasteners 399. Air reservoir tank 370 is a generally box-like structure having a top wall 371, a bottom wall 372, a pair of end walls 373,374 and a pair of sidewalls 375,376 forming air reservoir 305. Air reservoir 305 is in fluid communication with air spring bellows 341 via a hose 390 that is fluidly connected to the reservoir through inboard sidewall 375 via fastener 391 and which is fluidly connected to air spring 324 via fastener 345.

Air reservoir 305 serves as an external reservoir volume as described above and provides damping characteristics to air spring 324 during operation of the vehicle.

Figure 17:
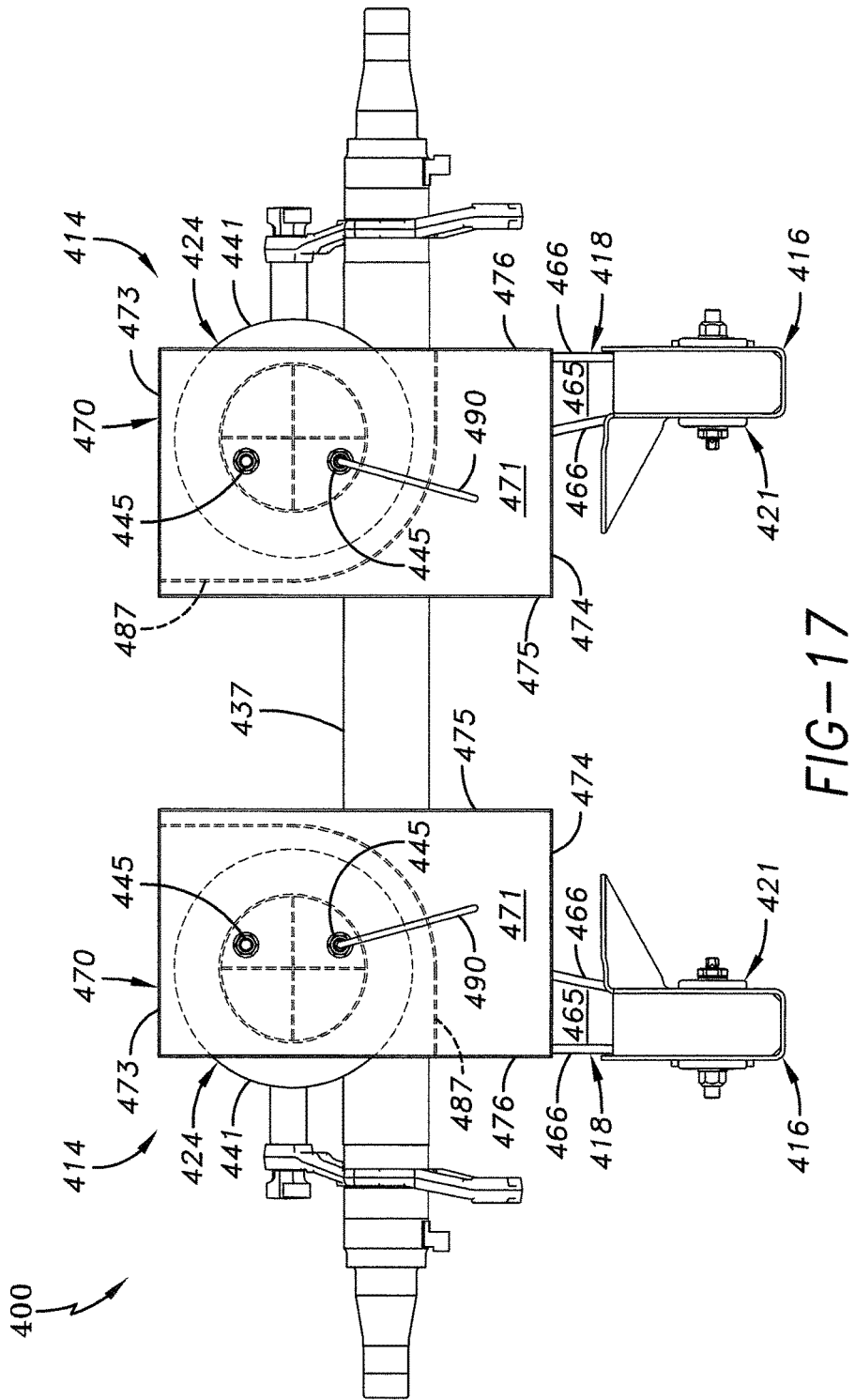
FIG. 17 is a representative top view of a fourth preferred embodiment suspension system of the present invention which may be used in the vehicle of FIG. 1 with hidden portions represented by broken lines, showing the external air reservoir volume incorporated into a spacer that is disposed and mounted above the air spring of its respective beam and suspension assembly of the suspension system.
Figure 18:
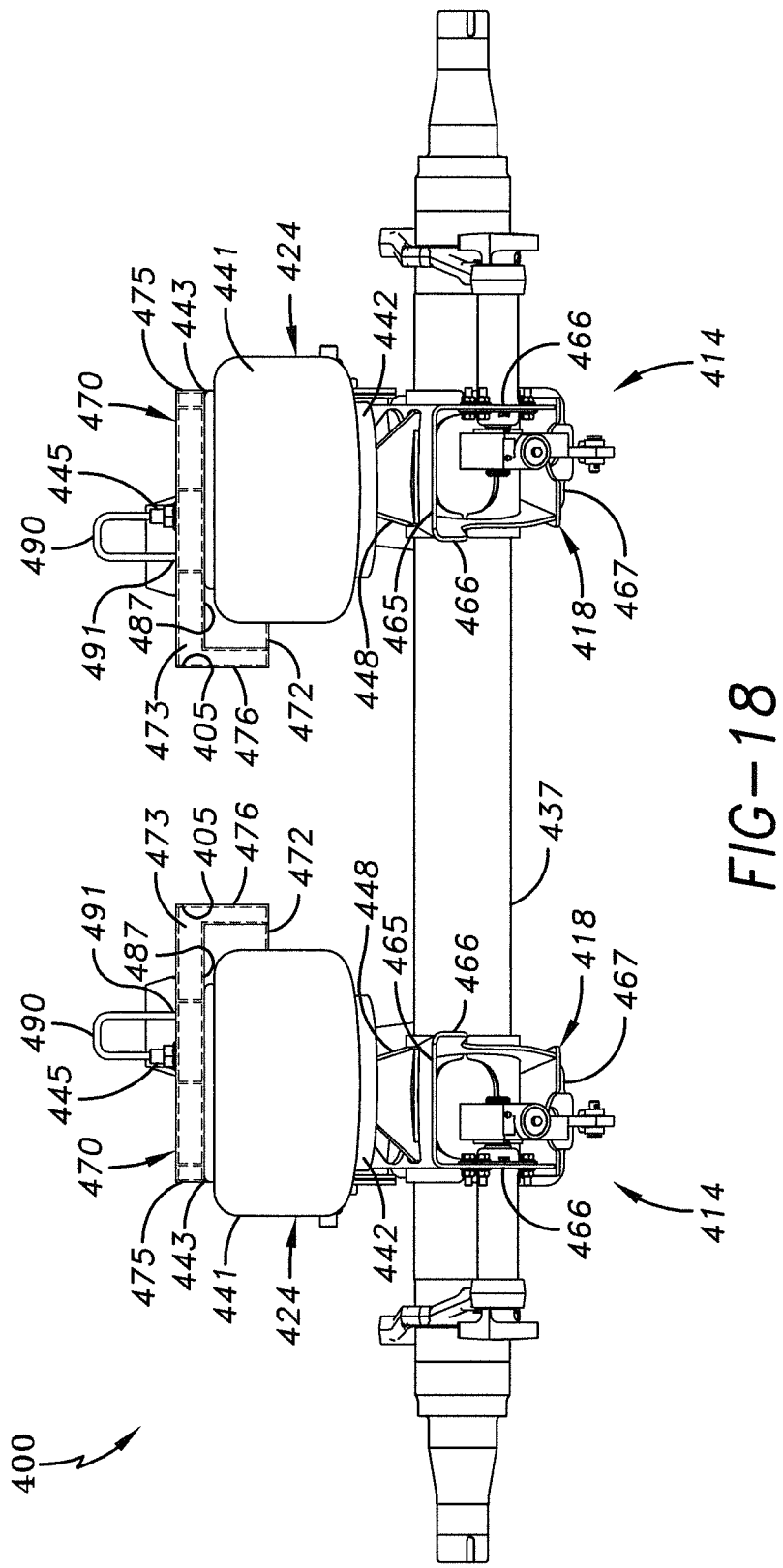
FIG. 18 is a representative rear view of the fourth preferred embodiment suspension system of the present invention shown in FIG. 17 with hidden portions represented by broken lines, showing the external air reservoir volume incorporated into a spacer that is disposed and mounted above the air spring of its respective beam and suspension assembly of the suspension system.
Figure 19:
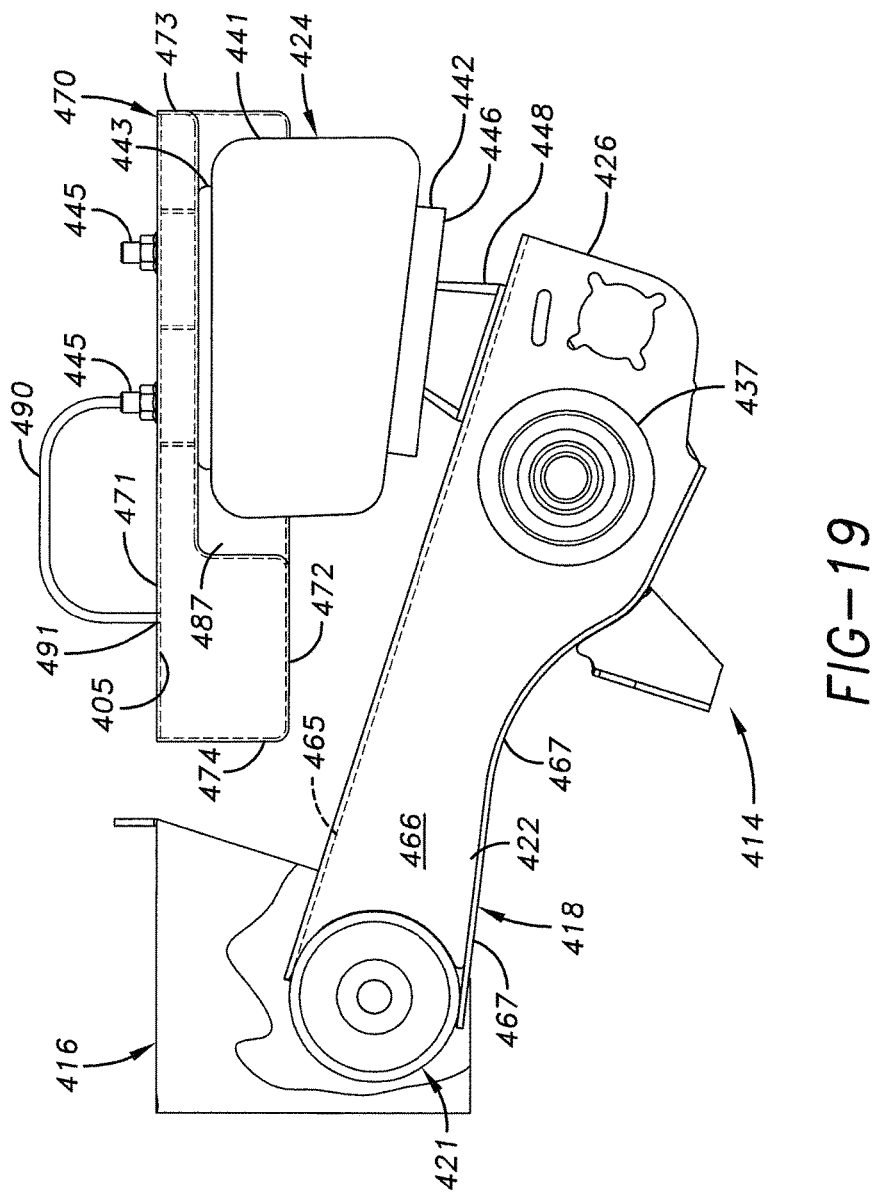
FIG. 19 is an enlarged representative side view of one of the beams of the fourth preferred embodiment suspension system shown in FIG. 17 with portions of the hanger removed and with hidden portions represented by broken lines, showing the external air reservoir volume incorporated into a spacer that is disposed and mounted on the air spring of the suspension assembly.

Turning now to FIGS. 17-19, a fourth preferred embodiment suspension system of the present invention, including an external air reservoir volume 405 incorporated into a spacer 470 that is disposed and mounted above the air spring of its respective beam and suspension assembly of the suspension system, is shown generally at reference numeral 400 and will be described in detail below. Suspension system 400 includes a pair of suspension assemblies 414 that are transversely spaced from one another and capture an axle 437 in a manner well known in the art. Because suspension assemblies 414 are generally mirror images of one another, for purposes of clarity and conciseness, only a single suspension assembly will be described below.

Suspension assembly 414 includes a longitudinally extending elongated beam 418. Beam 418 is formed having a generally upside-down integrally formed U-shape with a pair of sidewalls 466 and a top plate 465, with the open portion of the beam facing generally downwardly. A bottom plate 467 extends between and is attached to the lowermost ends of sidewalls 466 by any suitable means such as welding to complete the structure of beam 418. Beam 418 is located adjacent to and below a respective one of a pair of spaced-apart longitudinally extending main members (not shown) and one or more cross members (not shown), which form the frame of the vehicle. More specifically, beam 418 includes a front end 422 having a bushing assembly 421, which includes a bushing, pivot bolts and washers as are well known in the art, to facilitate pivotal connection of the beam to a hanger bracket 416, which in turn is attached to and depends from a respective one of the main members (not shown) of the vehicle. Beam 418 also includes a rear end 426, which is welded or otherwise rigidly attached to transversely extending axle 437.

Suspension assembly 414 also includes an air spring 424, mounted on and extending between beam rear end 426 and the main member of the vehicle (not shown). Air spring 424 includes a bellows 441 and piston 442. The top portion of bellows 441 is sealingly engaged with a bellows top plate 443. Air spring spacer 471 is mounted on top plate 443 by fasteners/air inlets 445, which are also used to mount the top portion of air spring 424 to the vehicle main member (not shown). Piston 442 is generally cylindrically shaped and has a generally flat bottom plate 446 and top plate (not shown). Piston bottom plate rests on a pedestal 448 which is attached at beam rear end 426 in a manner well known in the art, such as by fasteners.

With continued reference to FIGS. 17-19, an important aspect of fourth preferred embodiment suspension system 400 of the present invention now will be described. Spacer 470 is disposed on top of air spring 424 via fasteners 445. Spacer 470 is a generally box-like structure having a top wall 471, a bottom wall 472, a pair of end walls 473,474 and a pair of sidewalls 475,476 forming air reservoir 405. Air reservoir 405 is in fluid communication with air spring bellows 441 via a hose 490 that is fluidly connected to the reservoir through top wall 471 via fastener 491 and is also fluidly connected to air spring 424 via fastener 445.

In this manner, air reservoir 405 serves as an external reservoir volume as described above and provides damping characteristics to air spring 424 during operation of the vehicle. Spacer 470 also includes a cavity 487 that accommodates the top portion of air spring 424. Because the top portion of air spring 424 is disposed partially within cavity 487, spacer 470 serves as a guard that protects the air spring from damage during operation of the vehicle.

Figure 23:
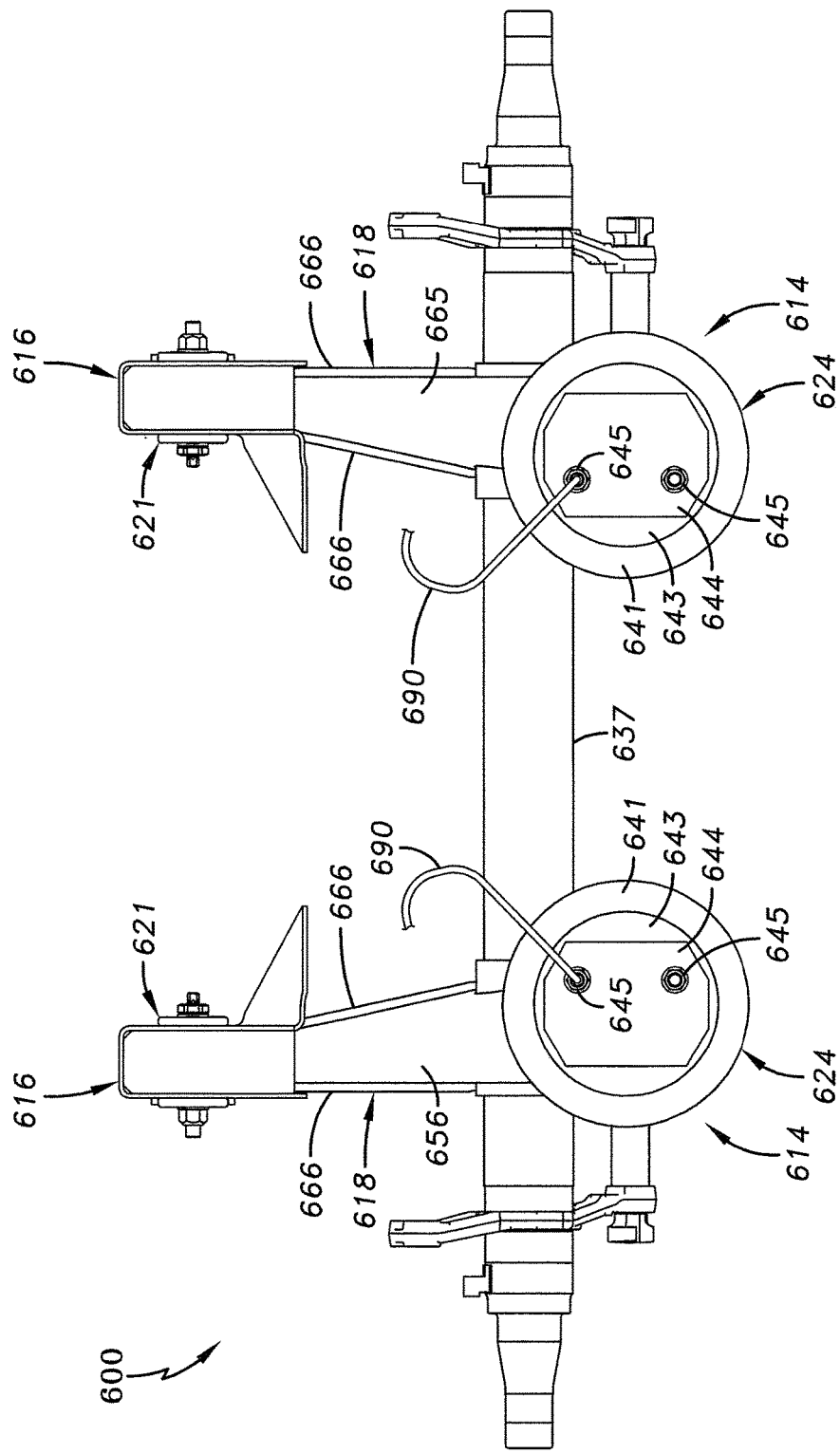
FIG. 23 is a representative top view of a fifth preferred embodiment suspension system of the present invention which may be used in the vehicle of FIG. 1, showing a portion of the hoses extending from the air springs.
Figure 23A:
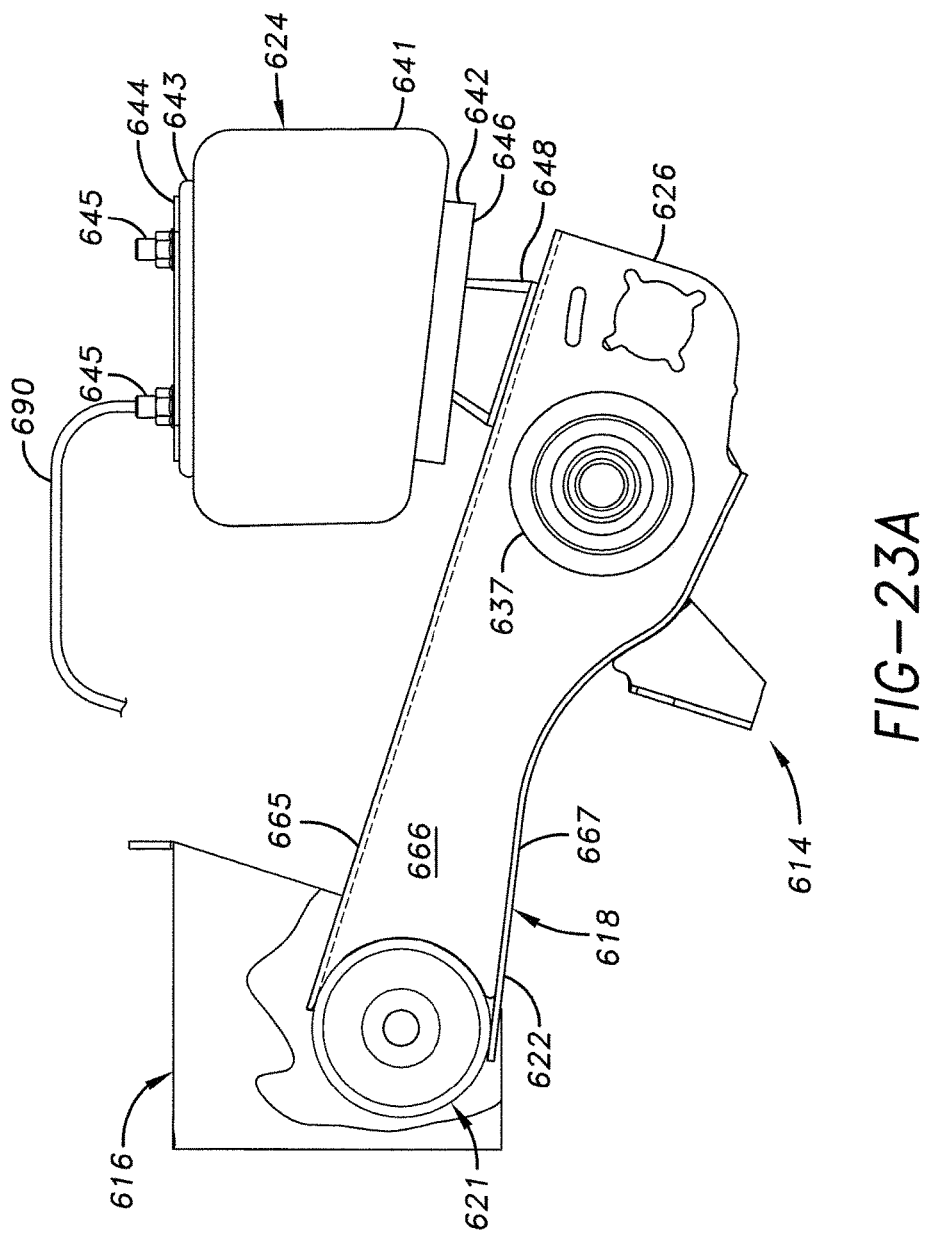
FIG. 23A is an enlarged representative side view of one of the beams of the fifth preferred embodiment suspension system shown in FIG. 23 with portions of the hanger removed and with hidden portions represented by broken lines, showing a portion of the hose extending from the air spring.

Turning now to FIGS. 23-23B, a fifth preferred embodiment suspension system of the present invention is shown mounted on a slider box for a heavy-duty vehicle, including an external air reservoir volume 605 incorporated into the main members of the slider box, is shown generally at reference numeral 600 and will be described in detail below. Suspension system 600 includes a pair of suspension assemblies 614 that are transversely spaced from one another and capture an axle 637 in a manner well known in the art. Because suspension assemblies 614 are generally mirror images of one another, for purposes of clarity and conciseness, only a single suspension assembly will be described below.

Suspension assembly 614 includes a longitudinally extending elongated beam 618. Beam 618 is formed having a generally upside-down integrally formed U-shape with a pair of sidewalls 666 and a top plate 665, with the open portion of the beam facing generally downwardly. A bottom plate 667 extends between and is attached to the lowermost ends of sidewalls 666 by any suitable means such as welding to complete the structure of beam 618. Beam 618 is located adjacent to and below a respective one of a pair of spaced-apart longitudinally extending main members 688 and one or more cross members 689, which form the frame of the vehicle (FIG. 23B). More specifically, beam 618 includes a front end 622 having a bushing assembly 621, which includes a bushing, pivot bolts and washers as are well known in the art, to facilitate pivotal connection of the beam to a hanger bracket 616, which in turn is attached to and depends from a respective one of the main members 688 of the vehicle. Beam 618 also includes a rear end 626, which is welded or otherwise rigidly attached to transversely extending axle 637.

Suspension assembly 614 also includes an air spring 624, mounted on and extending between beam rear end 626 and the main member 688 of the vehicle. Air spring 624 includes a bellows 641 and piston 642. The top portion of bellows 641 is sealingly engaged with a bellows top plate 643. An air spring mounting plate 644 is mounted on top plate 643 by fasteners/air inlets 645, which are also used to mount the top portion of air spring 624 to the slider box main member 688. Piston 642 is generally cylindrically shaped and has a generally flat bottom plate 646 and top plate (not shown). Piston bottom plate rests on a pedestal 648 that is attached at beam rear end 626 in a manner well known in the art, such as by fasteners.

With continued reference to FIGS. 23-23B, an important aspect of fifth preferred embodiment suspension system 600 of the present invention now will be described. Slider box main member 688 includes a pair of internal plates 671, 672 located inside the generally rectangular-shaped cross section main members as shown in FIG. 23B. Plates 671,672 and the rectangular cross sectioned structure of main members 688 form air reservoir 605 in the main member. Air reservoir 605 is in fluid communication with air spring bellows 641 via a hose 690 that is fluidly connected to the reservoir through the inboard sidewall of main member 688 via fastener 691, and which is fluidly connected to air spring 624 via fastener 645.

In this manner, air reservoir 605 serves as an external reservoir volume as described above and provides damping characteristics to air spring 624 during operation of the vehicle.

Figure 24:
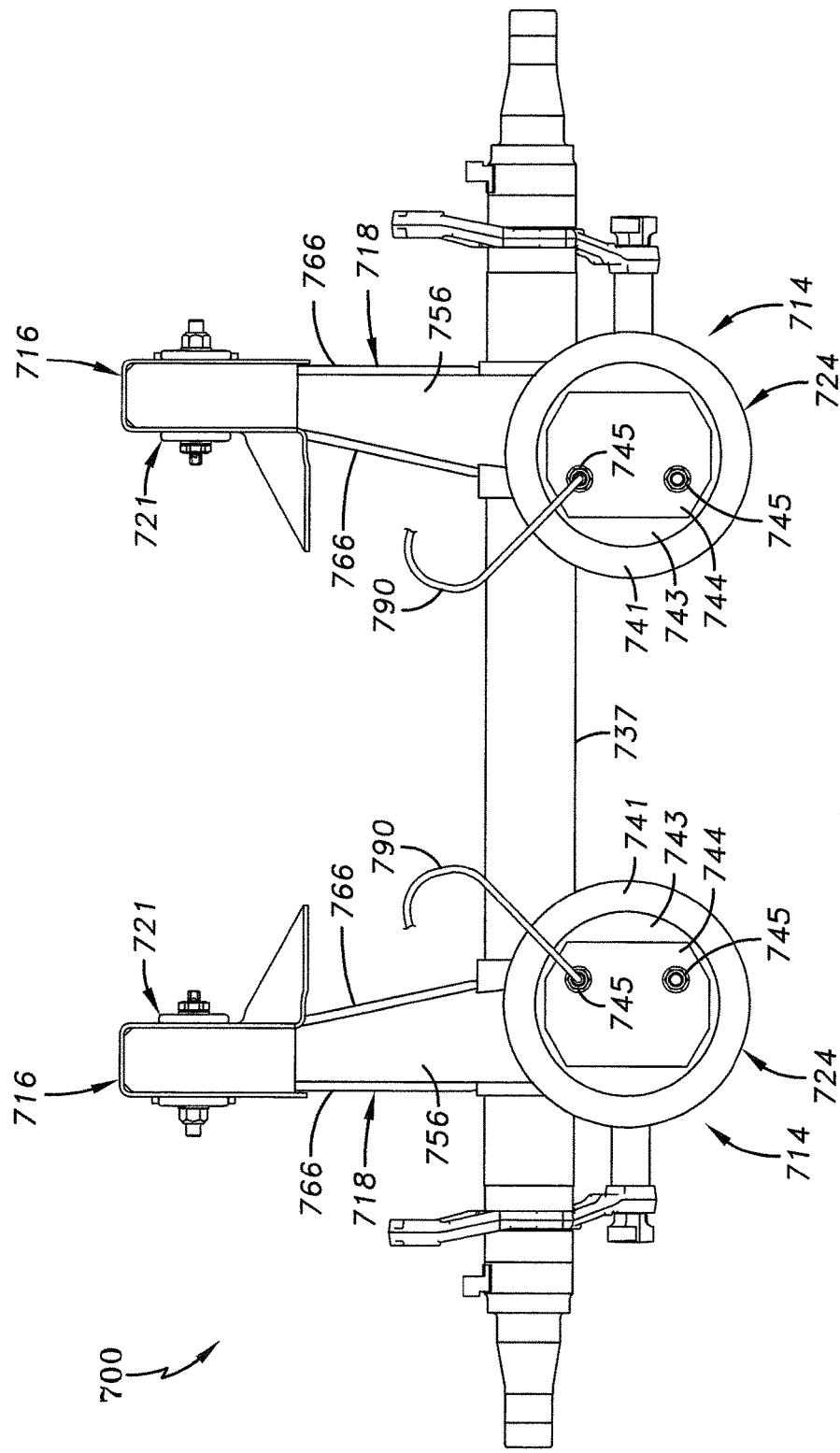
FIG. 24 is a representative top view of a sixth preferred embodiment suspension system of the present invention which may be used in the vehicle of FIG. 1, showing a portion of the hoses extending from the air springs.
Figure 24A:
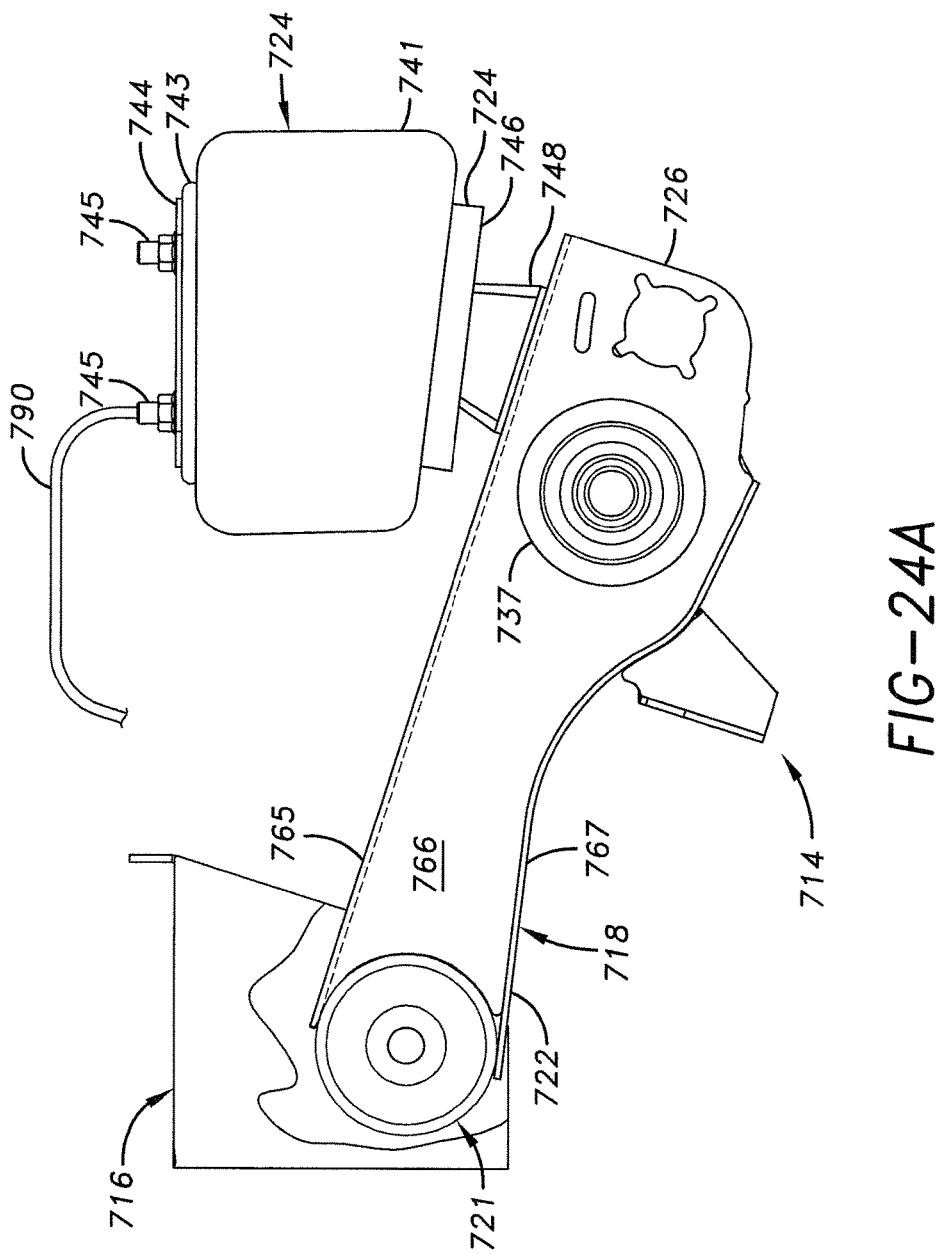
FIG. 24A is an enlarged representative side view of one of the beams of the sixth preferred embodiment suspension system shown in FIG. 24 with portions of the hanger removed and with hidden portions represented by broken lines, showing a portion of the hose extending from the air spring.

Turning now to FIGS. 24-24B, a sixth preferred embodiment suspension system of the present invention is shown mounted on a slider box for a heavy-duty vehicle, including a pair of external air reservoir volumes 705 incorporated into the cross member of the slider box, is shown generally at reference numeral 700 and will be described in detail below. Suspension system 700 includes a pair of suspension assemblies 714 that are transversely spaced from one another and capture an axle 737 in a manner well known in the art. Because suspension assemblies 714 are generally mirror images of one another, for purposes of clarity and conciseness, only a single suspension assembly will be described below.

Suspension assembly 714 includes a longitudinally extending elongated beam 718. Beam 718 is formed having a generally upside-down integrally formed U-shape with a pair of sidewalls 766 and a top plate 765, with the open portion of the beam facing generally downwardly. A bottom plate 767 extends between and is attached to the lowermost ends of sidewalls 766 by any suitable means such as welding to complete the structure of beam 718. Beam 718 is located adjacent to and below a respective one of a pair of spaced-apart longitudinally extending main members 788 and one or more cross members 789 (only one shown), which form the frame of the vehicle (FIG. 24B). More specifically, beam 718 includes a front end 722 having a bushing assembly 721, which includes a bushing, pivot bolts and washers as are well known in the art, to facilitate pivotal connection of the beam to a hanger bracket 716, which in turn is attached to and depends from a respective one of main members 788 of the vehicle. Beam 718 also includes a rear end 726, which is welded or otherwise rigidly attached to transversely extending axle 737.

Suspension assembly 714 also includes an air spring 724, mounted on and extending between beam rear end 726 and main member 788 of the vehicle. Air spring 724 includes a bellows 741 and piston 742. The top portion of bellows 741 is sealingly engaged with a bellows top plate 743. An air spring mounting plate 744 is mounted on top plate 743 by fasteners/air inlets 745, which are also used to mount the top portion of air spring 724 to the slider box main member 788. Piston 742 is generally cylindrically shaped and has a generally flat bottom plate 746 and top plate (not shown). Piston bottom plate rests on a pedestal 748 that is attached at beam rear end 726 in a manner well known in the art, such as by fasteners.

With continued reference to FIGS. 24-24B, an important aspect of sixth preferred embodiment suspension system 700 of the present invention now will be described. Slider box cross member 789 includes an internal plate 771 located inside the generally rectangular-shaped cross member as shown in FIG. 24B. Plate 771 and the rectangular cross sectioned structure of cross member 789 form air reservoirs 705 in the cross member. Each air reservoir 705 is in fluid communication with its respective air spring bellows 741 via a hose 790 that is fluidly connected to the reservoir, preferably through a sidewall of cross member 789 via fastener 791, and which is fluidly connected to its respective air spring 724 via fastener 745.

In this manner, air reservoir 705 serves as an external reservoir volume as described above and provides damping characteristics to air spring 724 during operation of the vehicle.

First, second, third fourth, fifth and sixth preferred embodiment suspension systems described above include reservoirs 105,205,305,405, 605,705 respectively, fluidly connected to air springs 124,224,324,424, 624,724 via a hose 190,290,390,490, 690,790 that passes through top plate 143,243,343,443, 643,743 of the air spring. It should be understood that the embodiments described above could utilize an alternative plumbing/hose arrangement 500 with the hose extending from pistons 142, 242, 342, 442, 642,742 as shown and described generally in FIGS. 20-22 below.

Turning now to FIGS. 20-22 an alternative hose arrangement for plumbing the external reservoir to the air spring through the piston of the air spring is shown generally at reference numeral 500 in a suspension assembly 514 and will be described in detail below.

Suspension assembly 514 includes a longitudinally extending elongated beam 518. Beam 518 is formed having a generally upside-down integrally formed U-shape with a pair of sidewalls 566 and a top plate 565, with the open portion of the beam facing generally downwardly. A bottom plate 567 extends between and is attached to the lowermost ends of sidewalls 566 by any suitable means such as welding to complete the structure of beam 518. Beam 518 is located adjacent to and below a respective one of a pair of spaced-apart longitudinally extending main members (not shown) and one or more cross members (not shown), which form the frame of the vehicle. More specifically, beam 518 includes a front end 522 having a bushing assembly 521, which includes a bushing, pivot bolts and washers as are well known in the art, to facilitate pivotal connection of the beam to a hanger bracket (not shown), which in turn is attached to and depends from a respective one of the main members (not shown) of the vehicle. Beam 518 also includes a rear end 526, which is welded or otherwise rigidly attached to a transversely extending axle (not shown).

Suspension assembly 514 also includes an air spring 524, mounted on and extending between beam rear end 526 and the main member of the vehicle (not shown). Air spring 524 includes a bellows 541 and piston 542. The top portion of bellows 541 is sealingly engaged with a bellows top plate 543. Air spring spacer 571 is mounted on top plate 543 by fasteners 545, which are also used to mount the top portion of air spring 524 to the vehicle main member (not shown). Piston 542 is generally cylindrically shaped and has a generally flat bottom plate 546 and top plate (not shown). Piston bottom plate rests on and is attached to beam rear end 526 via a combination threaded stud/air port 585 that extends through an opening 586 formed in bottom plate 546 of piston 542. An air passage 587 is formed in internal bumper 588 and allows fluid communication from bellows 541 through the bumper, through piston 542, through combination threaded stud/air port 585, and into a hose 590 attached to the combination threaded stud/air port. Hose 590 is connected to an external reservoir, such as the ones described and shown above. In this manner, an alternative plumbing arrangement is provided that allows air flow through piston 542 rather than through the bellows top plate as described in first, second, third fourth, fifth and sixth preferred embodiment suspension systems described above.

It should be understood that the length and diameter of hoses 190,290,390,490,590,690 could be modified in order to optimize the damping characteristics of the air spring. For example, a preferred hose 190 has a diameter of between about 0.25 inches and about 1.00 inches and a length of from about 0.125 inches to about 4.0 feet, or longer. By altering the diameter and/or length of hoses 190,290,390,490,590, 690,790 the damping characteristics of the air spring can be optimized or tuned for particular applications.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A suspension assembly for a heavy-duty vehicle comprising:
   an air spring;
   an air reservoir external to the air spring, said external air reservoir being in fluid communication with said air spring for providing damping characteristics to the air spring; and
   means for restricting air flow from said external air reservoir to said air spring, and from the air spring to the external air reservoir, said means for restricting air flow including an opening having a diameter of from about 0.25 inches to about 1.00 inches and a length of at least about 0.125 inches, wherein said air spring, said external air reservoir and said means for restricting air flow comprise a closed fluid communication system, wherein a ratio of a volume of the external air reservoir to a volume of said air spring is about 1:2.5 or greater.

2. The suspension assembly for a heavy-vehicle of claim 1, wherein said means for restricting air flow from said external air reservoir to said air spring, and from the air spring to the external air reservoir for providing damping characteristics to the air spring comprises a hose fluidly connected between said external air reservoir and said air spring.

3. The suspension assembly for a heavy-duty vehicle of claim 1, wherein said means for restricting air flow is connected to a fastener/inlet located on a top plate of said air spring.

4. The suspension assembly for a heavy-duty vehicle of claim 1, wherein said means for restricting air flow is connected to a fastener/inlet disposed through a piston of said air spring.

5. The suspension assembly for a heavy-duty vehicle of claim 1, wherein said external air reservoir is incorporated into a beam of said suspension assembly, said beam generally forming said external air reservoir.

6. The suspension assembly for a heavy-duty vehicle of claim 1, wherein said external air reservoir comprises a tank that is disposed within a beam of said suspension assembly.

7. The suspension assembly for a heavy-duty vehicle of claim 1, wherein said external air reservoir is incorporated into a main member of a slider box or a frame of said heavy-duty vehicle, said main member generally forming said external air reservoir.

8. The suspension assembly for a heavy-duty vehicle of claim 1, wherein said external air reservoir is incorporated into a cross member of a slider box or a frame of said heavy-duty vehicle, said cross member generally forming said external air reservoir.

9. The suspension assembly for a heavy-duty vehicle of claim 1, wherein said external air reservoir comprises an air spring spacer, said air spring spacer located generally above and adjacent said air spring, whereby said spacer protects said air spring from damage during operation of said heavy-duty vehicle.

10. The suspension assembly for a heavy-duty vehicle of claim 1, wherein said external air reservoir comprises a tank that is disposed and mounted adjacent a beam of said suspension assembly.

* * * * *